United States Patent
Hunter et al.

(10) Patent No.: US 11,199,867 B2
(45) Date of Patent: Dec. 14, 2021

(54) THROTTLE SYSTEM

(71) Applicant: Textron Aviation Inc., Wichita, KS (US)

(72) Inventors: Mark Sheridan Hunter, Colwich, KS (US); Ronald J. Parker, Maize, KS (US); Philippe A. Ciholas, Sedgwick, KS (US)

(73) Assignee: Textron Innovations, Inc., Providence, RI (US)

( * ) Notice: Subject to any disclaimer, the term of this patent is extended or adjusted under 35 U.S.C. 154(b) by 8 days.

(21) Appl. No.: 16/707,586

(22) Filed: Dec. 9, 2019

(65) Prior Publication Data

US 2021/0173425 A1 Jun. 10, 2021

Related U.S. Application Data

(60) Provisional application No. 62/776,732, filed on Dec. 7, 2018.

(51) Int. Cl.
| | |
|---|---|
| *G05G 5/03* | (2008.04) |
| *B64D 31/04* | (2006.01) |
| *B64D 31/14* | (2006.01) |
| *F02C 9/32* | (2006.01) |
| *G05G 13/00* | (2006.01) |
| *G05G 1/04* | (2006.01) |

(52) U.S. Cl.
CPC ............... *G05G 5/03* (2013.01); *B64D 31/04* (2013.01); *B64D 31/14* (2013.01); *F02C 9/32* (2013.01); *G05G 1/04* (2013.01); *G05G 13/00* (2013.01); *F05D 2220/323* (2013.01); *F05D 2270/01* (2013.01); *G05G 2505/00* (2013.01)

(58) Field of Classification Search
CPC .... B64D 31/14; G05G 13/00; G05G 2505/00; F05D 2270/01
See application file for complete search history.

(56) References Cited

U.S. PATENT DOCUMENTS

| | | | | |
|---|---|---|---|---|
| 2,373,225 A | * | 4/1945 | Clickner | B63H 21/213 74/531 |
| 2,382,330 A | * | 8/1945 | Pain | B64D 31/04 74/531 |
| 2,401,741 A | * | 6/1946 | Korodi | B64C 11/305 74/531 |
| 3,363,480 A | * | 1/1968 | Murphy | G05G 11/00 475/4 |
| 4,018,104 A | * | 4/1977 | Bland | G05G 5/22 74/531 |
| 5,488,824 A | | 2/1996 | LeDoux et al. | |
| 6,340,289 B1 | | 1/2002 | Vos et al. | |
| 7,188,008 B2 | | 3/2007 | Garnaud et al. | |
| 8,480,037 B2 | | 7/2013 | Belkadi et al. | |
| 9,096,325 B2 | | 8/2015 | Oltheten et al. | |

(Continued)

*Primary Examiner* — Vicky A Johnson
(74) *Attorney, Agent, or Firm* — Erise IP, P.A.

(57) ABSTRACT

Disclosed is a throttle quadrant arrangement having a throttle lever which is independently mechanically connected to different Rotary Variable Differential Transformers (RVDTs). A friction lever selectively creates and releases friction from the throttle lever to enable it to be selectively positioned. The system is configured such that the mechanical connections existing between the throttle lever and the RVDTs are shielded from the friction created by the friction lever.

20 Claims, 16 Drawing Sheets

(56) References Cited

U.S. PATENT DOCUMENTS

| | | |
|---|---|---|
| 10,006,928 B1 | 6/2018 | Hagerott et al. |
| 10,137,997 B2 | 11/2018 | Nouhaud |
| 2019/0176997 A1* | 6/2019 | Lambton ................ B64D 31/04 |
| 2020/0182177 A1* | 6/2020 | Hunter ................ F02D 41/1497 |
| 2020/0182183 A1* | 6/2020 | Hunter ................ F02D 41/1497 |

* cited by examiner

THROTTLE SYSTEM

CROSS-REFERENCE TO RELATED APPLICATIONS

This application claims the benefit of U.S. Provisional Patent Application No. 62/776,732 filed Dec. 7, 2018, the entire contents of which are hereby incorporated by reference.

BACKGROUND OF THE INVENTION

1. Field

The disclosed embodiments relate generally to the field of throttle quadrant systems for aircraft. More specifically, the embodiments relate to the prevention of mechanical failures existing between the throttle and engine of the aircraft.

2. Description of the Related Art

Throttle arrangements have been used in aircraft. Some throttles operate by converting mechanical activation from the throttle lever into digital information that is received by a controller, which takes the digital information received and in turn, changes an aircraft parameter (e.g., engine speed), in response.

FIG. 1 discloses shows a prior art throttle system arrangement 10 which might be employed in a typical two-engine jet-propelled aircraft having engines on both sides of the aircraft. In this sort of arrangement, a throttle control block 12 includes first and second sticks, 14 and 16 which are located in close proximity to one another so that they can be easily moved together. But the two sticks are also independent so that each can be moved to different settings. Each stick is configured to operate one of two turbine engines, 18 and 20. The rotation of each of sticks 14 and 16 is mechanically imparted into pairs Rotary Variable Differential Transformers (RVDTs). RVDTs, as is known in the art, take mechanical rotation, and based on angular displacement, transmit signals so that the extent of displacement can be used by digitally-based electronic systems existing in the aircraft. Referring to FIG. 1, first stick 14 is mechanically connected to each of the RVDTs in a pair 22 via a common mechanical linking system (not shown). Two RVDTs are used instead of one in order to meet redundancy requirements. The mechanical rotation is translated by the RVDTs 22 into digital signals which are received into a Full Authority Digital Engine Control (FADEC) system 24. A FADEC includes a computer and operates as an engine control unit. Normally the FADEC controls most or all aspects performance for the turbine engines. For example, the correct fuel flow and power levels for the engine are determined by the FADEC. In the FIG. 1 conventional system, a FADEC 24 is used to operate a first 26 of two engines. The electronic signals emitted from the RVDT pair 22 are interpreted by the FADEC 24, and used to automatically increase or decrease the speed of the first turbine engine 26 through varying fuel rate as well as numerous other variables.

The system also includes a stick 16 to control engine 20. More specifically, stick 16 is linked mechanically to a second RVDT pair 26. The pair feeds signals into a FADEC 28, and then FADEC 28 controls the fuel flow, and thus the speed of engine 20.

FIG. 2 shows a second prior art throttle system 11 used on a single-engine turboprop aircraft. Those skilled in the art will recognize that a turboprop engine is one where a turbine engine 21 drives an aircraft propeller 19. This conventional system utilizes a block 13 including two levers 15 and 17. Lever 15 controls the pitch of the turboprop, whereas second lever 17 controls turbine speed. By independently moving levers 15 and 17, thrust output is controlled. The pitch of the propeller and the speed of the turbine are controlled by two separate mechanical systems.

SUMMARY

A throttle system for an aircraft is disclosed. In some embodiments the system has a throttle lever. The lever is mechanically connected to first and second mechanical-rotation to electronic conversion devices, each of the first and second conversion devices being adapted to receive mechanical angular rotation. The devices emit first and second electronic signals, each indicating a rotation extent. The system also includes an automated control system configured to use either of the first and second electronic signals to control the operation of an engine. In some versions the conversion devices can be Rotary Variable Differential Transformers (RVDTs).

In some embodiments, the electronic signals are utilized by the automated control system to control the speed of a turbine engine, a piston engine, or the pitch of a propeller and also the speed of an engine used to drive the propeller.

A linkage system can include first and second mechanical linking systems connecting the throttle lever to the first and second conversion devices and upon a failure in the first linking system, the second mechanical linking system will remain operational. In some embodiments, a first designed point of failure is established in the first mechanical linking system, the first designed point of failure creating a disengaging breaking upon encountering a first abnormal resistance force, the first designed point of failure avoiding interference in the mechanical operation of the second mechanical linking system. Similarly, a second designed point of failure is established in the second mechanical linking system, the second designed point of failure creating a disengaging breaking upon encountering a second abnormal resistance force, the second designed point of failure avoiding interference in the mechanical operation of the first mechanical linking system.

In some versions the point of failure is established using a shearable fastener establishing a point of connection between two structural components in the linking system as a weakest point upon the encountering of a resistance force. Optionally, the point of failure is established by incorporating frangible links into the first and second mechanical linking systems.

In other embodiments the point of failure in the first mechanical linkage system is established by a spring-driven plunger arrangement incorporated adjacent to a detent formed into a disk-drive lever rotating with the throttle stick, the detent being configured to receive a tip of the plunger, the plunger and detent being designed such that when the first abnormal force of resistance is encountered, a spring force of the ball plunger will be overcome, and the tip rises up out of the detent releasing the drive lever. The plunger arrangement can be designed according to the formula $TSF = F/\tan(\emptyset/2)$ where TSF is a desired threshold side force, F is an end force for a spring in the plunger, and $\emptyset$ is the angle at which a pair of opposing side walls in the detent exist relative to one another.

In other embodiments, the point of failure is established using a first linking subsystem including a first disk rotatable about the hub, the first disk connected to and driven by the throttle lever to create a first tangential source of leverage, the first disk using the leverage to drive a first link, the first link being mechanically connected to rotate the first conversion device; and a second linking subsystem comprising a second disk rotatable about the hub, the second disk connected to and driven by the throttle lever to create a second tangential lever, the second lever driving a second link connected to rotate the second conversion device.

In some embodiments a third linking subsystem including a third rotating disk rotatable about the hub, the third disk connected to and driven by the throttle lever to create a third tangential lever, the third lever driving a third link connected to rotate a third conversion device, the third conversion device configured to, upon movements of the throttle lever, transmit a third signal independently usable by the engine control system to increase or decrease speed.

In some embodiments a first drive arm extending outward from the first disk, the first drive arm mechanically connected to a first linking arm, the first linking arm mechanically connected to and configured to create rotation in the first conversion device; and a second drive arm extending out from the second disk, the second drive arm mechanically connected to a second linking arm, the second linking arm mechanically connected to and configured to create rotation in the second conversion device.

The throttle system, in some embodiments, has first and second disks are each divided into separable halves, a receiving half linked to receive rotation from the throttle lever, and a driving used to mechanically impart rotation into the conversion devices, the separable halves being secured together by shear members, the shear members configured to fail upon a mechanical jam and release a jammed first or second disk as a driving connection between the throttle lever and the first or second conversion device.

The conversion devices can be Rotary Variable Differential Transformers (RVDTs). In embodiments, signals from the conversion devices are redundant, the engine control system being operable on either.

In yet other embodiments, disclosed is a system for operating an aircraft having a throttle system including a single throttle lever, the lever being mechanically connected to a plurality of conversion devices, each of the conversion devices adapted to receive mechanical angular rotation upon operation of the throttle lever, and emit an electronic signal indicative of a rotation extent. Additionally, an independent mechanical arrangement can exist between the throttle lever and each conversion device, each mechanical arrangement being designed such that inoperability of one independent mechanical arrangement will not defeat operability of at least one other mechanical arrangement.

In other embodiments, a friction-creating lever operated along with the throttle lever, the friction-creating lever selectively applying lateral compression to the throttle lever enabling the compression lever to be selectively secured into a plurality of different positions; and the mechanical arrangements between the throttle lever and each conversion device being configured such that they are not exempted from the lateral compression applied to the throttle lever. In some arrangements, a control system is configured to: (i) receive electrical outputs from each of the conversion devices; (ii) detect if the signal readings from any of the conversion devices are outside of a range, the range indicating operability; and (iii) use a signal reading from one or more of a still-properly-operating conversion device, or an average reading of a plurality of devices as a thrust indication.

Processes for evaluating the viability of RVDTs and other conversion devices are also disclosed. For example, a process is disclosed for managing signals from a plurality of conversion devices in an aircraft, each conversion device being configured to receive an input from a mechanical system, and create an electrical signal output to an engine control system. In embodiments, the process includes continually reading electrical outputs from first, second, and third conversion devices in the plurality; determining if the signal readings from any of the first, second, and third conversion devices are outside of a predetermined range, inclusion in the range indicating operability; and establishing a thrust commands in the engine control system based on the inclusion in the range of each of the signals received from the first, second, and third conversion devices.

In some versions the process involves using a reading from any one of the first, second, and third conversion devices in the engine control system to establish a thrust command if all of the first, second, and third conversion devices are within the predetermined range. Where readings from the first and second conversion devices are inside of the range, and the reading from the third conversion device is outside of the range, the system can use a reading from one or both of the first and second conversion devices in the engine control unit as a thrust command. Sometimes the reading from the first conversion device is used alone in the engine control unit as a thrust command, and sometimes this is done by averaging the readings derived from both the first and second devices to comprise a thrust command utilized by the engine control unit. In some embodiments, a warning is transmitted to an alert system on the aircraft.

In some embodiments where: (i) only one of the readings from the first, second, and third conversion devices is within the predetermined range, or (ii) none of the readings from the first and second conversion devices are inside of the range, using a default process to establish thrust commands in the engine control system. Since the conversion devices are thus unreliable, the system can use an idle power setting as the default setting if the aircraft is on the ground, or a cruise power setting if the aircraft is in the air. Also, due to urgency, a short term warning can be sent to an alert system on the aircraft.

A throttle-control system for aircraft is disclosed. In the system, a throttle lever mechanically connected to a first, second, and third conversion device; the first, second, and third conversion devices configured to receive mechanical rotation created by the throttle lever, and generate first, second, and third signals, respectively; an engine control system adapted to maintain a thrust output, the engine control system including a processing component; the processing component configured to: reading electrical outputs from first, second, and third conversion devices; determine if the signal readings from any of the first, second, and third conversion devices are outside of a predetermined range, an inclusion in the range indicating operability; and establish a thrust output based upon the consideration of the inclusion of each of the signals received from the first, second, and third conversion devices inside the range.

In embodiments, the processing component further configured to do different things. For example, use a reading from one or both of the first and second conversion devices in the engine control unit as a thrust command where readings from the first and second conversion devices are inside of the range, and the reading from the third conversion device is outside of the range, use the reading from the first conversion device alone in the engine control unit as a thrust command, or average the readings derived from both the first and second devices to comprise a thrust command utilized by the engine control unit. Additionally, the processing component can be configured to activate a default process to establish thrust commands in the engine control system when: (i) only one of the readings from the first, second, and third conversion devices is within the predetermined range, or (ii) none of the readings from the first and second conversion devices are inside of the range, the default process being using an idle power setting as the default setting if the aircraft is on the ground, or using a cruise power setting if the aircraft is in the air. In this mode, a short term warning can be transmitted to an alert system on the aircraft.

Embodiments also involve isolating the throttle from the friction lever arrangement on the throttle quadrant. For example, a throttle system is disclosed including a throttle lever configured to rotate around a hub; a linking system, the linking system mechanically imparting rotation implemented by the throttle lever to an engine control system, the throttle lever rotating about a hub; a friction adjustment lever configured to rotate about the hub, the friction adjustment lever configured such that movement in a first direction of rotation around the hub increases friction experienced by the throttle lever, and movement in a second direction of rotation around the hub decreases friction experienced by the throttle; and a friction-exempting subsystem, the subsystem preventing the friction created by the friction adjustment lever to be experienced by the linking system.

In versions, the linking system includes at least one rotatable disk which is mechanically linked to and rotates with the throttle lever, the rotating disk driving at least one link to implement rotation into a mechanical-to-electrical conversion device, the mechanical-to-electrical conversion device configured to, upon movements of the lever, transmit signals indicating an extent of displacement which are used by the engine control system to increase or decrease speed. The friction adjustment lever in some embodiments creates friction using a cam arrangement, the cam arrangement creating compression between the friction adjustment lever and the throttle lever. More specifically, the rotating disk can be maintained in mechanical independence from the compression created by the cam arrangement by at least one spacing device, the spacing device bearing at least some of the compression created by the cam arrangement such that the rotating disk is unaffected by the friction. In embodiments, the hub is stationary and is secured between two opposing side plates.

In more specific embodiments, the cam arrangement includes a first cam portion located on a disk portion at the bottom of the friction lever, the first cam portion rotating against a second reciprocating cam portion located on a relatively stationary friction disk located in between the disk portion at the bottom of the friction lever and the throttle lever. The relatively stationary friction disk is prevented from rotation by a friction-disk linking bolt which is secured through the opposing side plates.

In embodiments, the friction adjustment lever is configured to loosen the throttle lever, and secure the throttle lever in place such that a pilot does not need to maintain a hand on the throttle lever to maintain a position.

In embodiments, a first linking subsystem including a first rotating disk rotatable about the hub, the first disk connected to and driven by the throttle lever to create a first tangential lever, the first lever driving a first link connected to rotate a first mechanical-to-electrical conversion device, the first mechanical-to-electrical conversion device configured to, upon movements of the throttle lever, transmit a first signal indicating a first extent of displacement which is usable by the engine control system to increase or decrease speed is implemented. Further, a second linking subsystem comprising a second rotating disk rotatable about the hub, the second disk connected to and driven by the throttle lever to create a second tangential lever, the second lever driving a second link connected to rotate a second mechanical-to-electrical conversion device, the second mechanical-to-electrical conversion device configured to, upon movements of the throttle lever, transmits a first signal indicating a second duplicitous extent of displacement which is usable by the engine control system to increase or decrease speed. The friction-exempting subsystem, in some embodiments, exempts the first and second disks from being subjected to friction created by the friction lever.

In embodiments, a third linking subsystem includes a third rotating disk rotatable about the hub, the third disk connected to and driven by the throttle lever to create a third tangential lever, the third lever driving a third link connected to rotate a third mechanical-to-electrical conversion device, the third mechanical-to-electrical conversion device configured to, upon movements of the throttle lever, transmit a third signal indicating a third extent of displacement which is optionally usable by the engine control system to increase or decrease speed. In versions, the third signal is redundant of the first and second signals, and the engine control system being operable on any of the first, second, or third signals. The friction-exempting subsystem can prevent the third disk from being subjected to friction created by the friction lever in embodiments.

In some embodiments, a throttle disk formed out of a lower portion of the throttle lever to configure the throttle lever to rotate around the hub; first and second apertures formed through the throttle disk to receive first and second bolts; and the first and second bolts pass through first and second sleeves, the second and first sleeves comprising the friction-exempting subsystem by bearing compression created by the friction lever, and transmitting the compression to the throttle disk.

In embodiments, a first linking subsystem and a second linking subsystem in the linking system; the first linking subsystem including a first rotating disk rotatable about the hub, the first disk connected to and driven by the throttle lever to create a first tangential lever, the first lever driving a first link connected to rotate a first mechanical-to-electrical conversion device, the first mechanical-to-electrical conversion device configured to, upon movements of the throttle lever, transmit a first signal indicating a first extent of displacement which is usable by the engine control system to increase or decrease speed. A second linking subsystem comprises a second rotating disk rotatable about the hub, the second disk connected to and driven by the throttle lever to create a second tangential lever, the second lever driving a second link connected to rotate a second mechanical-to-electrical conversion device, the second mechanical-to-electrical conversion device configured to, upon movements of the throttle lever, transmits a first signal indicating a second duplicitous extent of displacement which is usable by the engine control system to increase or decrease speed; and a compression disk located on the hub, the compression disk being connected to the first and second bolts thus sandwiching the first and second sleeves between the compression disk and the throttle disk, the first and second disks on the hub being contained between the compression disk and the throttle disk thus exempting the first and second disks from compression.

Also disclosed is a process for securing a throttle in a plurality of positions. The process includes steps of providing a throttle lever on a hub; creating rotation using the throttle lever; tangentially linking a plurality of redundant engine-driving disks on a hub to the throttle lever; configuring each of the engine-driving disks to redundantly link the throttle lever to an engine control system; creating compression on the throttle lever using a friction lever such that the throttle lever can be secured into the plurality of positions; securing the engine-driving disks between a compression-bearing disk on the hub and the throttle lever; and rigidly spacing apart the compression-bearing disk from the throttle lever to bear the compression created by the friction lever and preventing the friction created by the friction adjustment lever to be experienced by the engine-driving disks.

Also disclosed is a process including the steps of providing a throttle lever on a hub; creating rotation using the throttle lever; tangentially linking a plurality of redundant engine-driving disks on a hub to the throttle lever; configuring each of the engine-driving disks to redundantly link the throttle lever to an engine control system; creating compression on the throttle lever using a friction lever such that the throttle lever can be secured into the plurality of positions; securing the engine-driving disks between a compression-bearing disk on the hub and the throttle lever; rigidly spacing apart the compression-bearing disk from the throttle lever to bear the compression created by the friction lever and preventing the friction created by the friction adjustment lever to be experienced by the engine-driving disks.

BRIEF DESCRIPTION OF THE SEVERAL VIEWS OF THE DRAWINGS

Illustrative embodiments are described in detail below with reference to the attached drawing figures, which are incorporated by reference herein and wherein.

DETAILED DESCRIPTION

Figure 1:
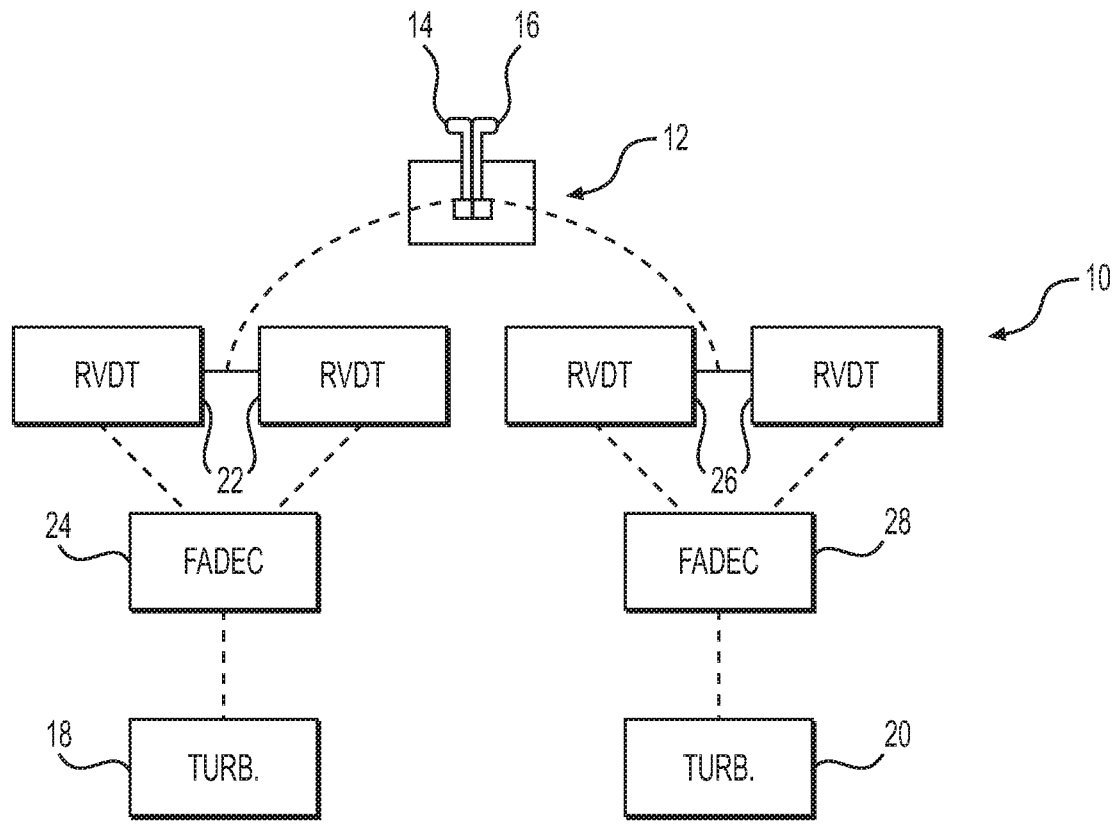
FIG. 1 shows a prior art throttle system arrangement sometimes employed in jet-propelled aircraft.
Figure 2:
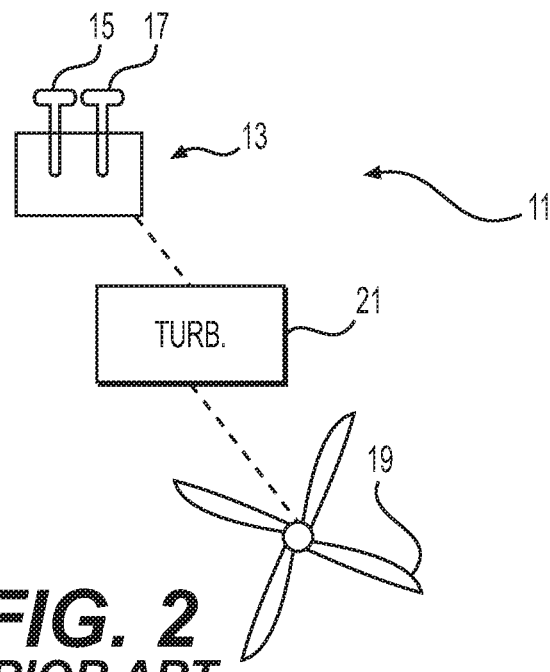
FIG. 2 shows a prior art throttle system used in most turboprop aircraft.

Embodiments provide systems and a method for controlling the speed and thrust of aircraft. In embodiments, the aircraft is a turboprop type. Turboprop aircraft have a turbine that is used to drive the aircraft propeller. In order to manipulate thrust, the pitch of the propeller blades can be adjusted.

High Level Description

The systems and methods of operation disclosed herein, unlike conventional systems, enable the use of a single throttle lever with a controller to operate more than one thrust related function on an aircraft. The controller could be an automated engine control system, e.g. a FADEC system. Additionally, the systems and methods enable the operation of a turboprop with only a single lever.

The single lever throttle quadrant feeds information about throttle lever commands to the controller (e.g., FADEC system). Three mechanical-rotation to electronic-conversion devices, e.g., RVDT's are used to verify throttle the single-lever position, and feed that information to the FADEC. The FADEC determines the correct fuel flow and power levels for the turbine engine, as well as pitch control for the propeller. Not only is the use of a single lever/FADEC system unique, the jam protection for a single point failure of the RVDT's is unique as well.

The unique protection against RVDT jamming is in the lower part of the throttle quadrant. The disclosed embodiment has three RVDTs connected to the single stick. The three mechanical linkage systems are each completely independent from each other. Each independent system takes rotation from the stick. The stick rotates the three disk levers (which rotate about the hub when acted on by the stick). When each disk lever is moved, it drives a link that causes rotation in a drive link, the rotation of which is measured by each RVDT. The three disk levers rotate together, and each mechanical system from the disk levers to each RVDT is completely mechanically independent. Thus, upon the encountering of an abnormal amount of resistance force, e.g., if one of these systems jams, the other two will continue to operate upon the rotation of the stick.

Each RVDT is independently connected by a four-bar linkage to two individual plates that rotate on the center hub of the throttle quadrant when the throttle lever is moved. The series of plates are rotatably mounted on the hub and connected to the throttle lever by two bolts. Two plates per RVDT are riveted together to provide a positive connection between the RVDT and the throttle lever. When a RVDT jam occurs, the force provided by the pilot on the throttle lever will shear the rivets located between the two plates of the corresponding RVDT. This causes the disengagement of the independent mechanical system serving the jammed RVDT, and allows the throttle lever to continue to rotate on the hub with the other two RVDT's, providing commands to the FADEC.

A voting system is used to determine how to read the RVDTs in the event of some error, e.g., a jam or other fault. The computer system receives position readings from all three RVDTs. If one of the three is different, then you use an average of the readings of the other two as true. More specifically, the process involves looking at the first two RVDT measurements, then seeing which of these two is the closest to the reading from the third RVDT. Thus, the third RVDT "votes" for the reading that is closest to it.

Historically some throttle arrangements have included the ability to impose friction on the throttle for desired feel, and more importantly to give the stick stay-ability in a particular location. This system provides means to have a stick-driven RVDT linkage system that is not impacted at all by increases or decreases indicated by the separate friction lever.

System Embodiment

Figure 3:
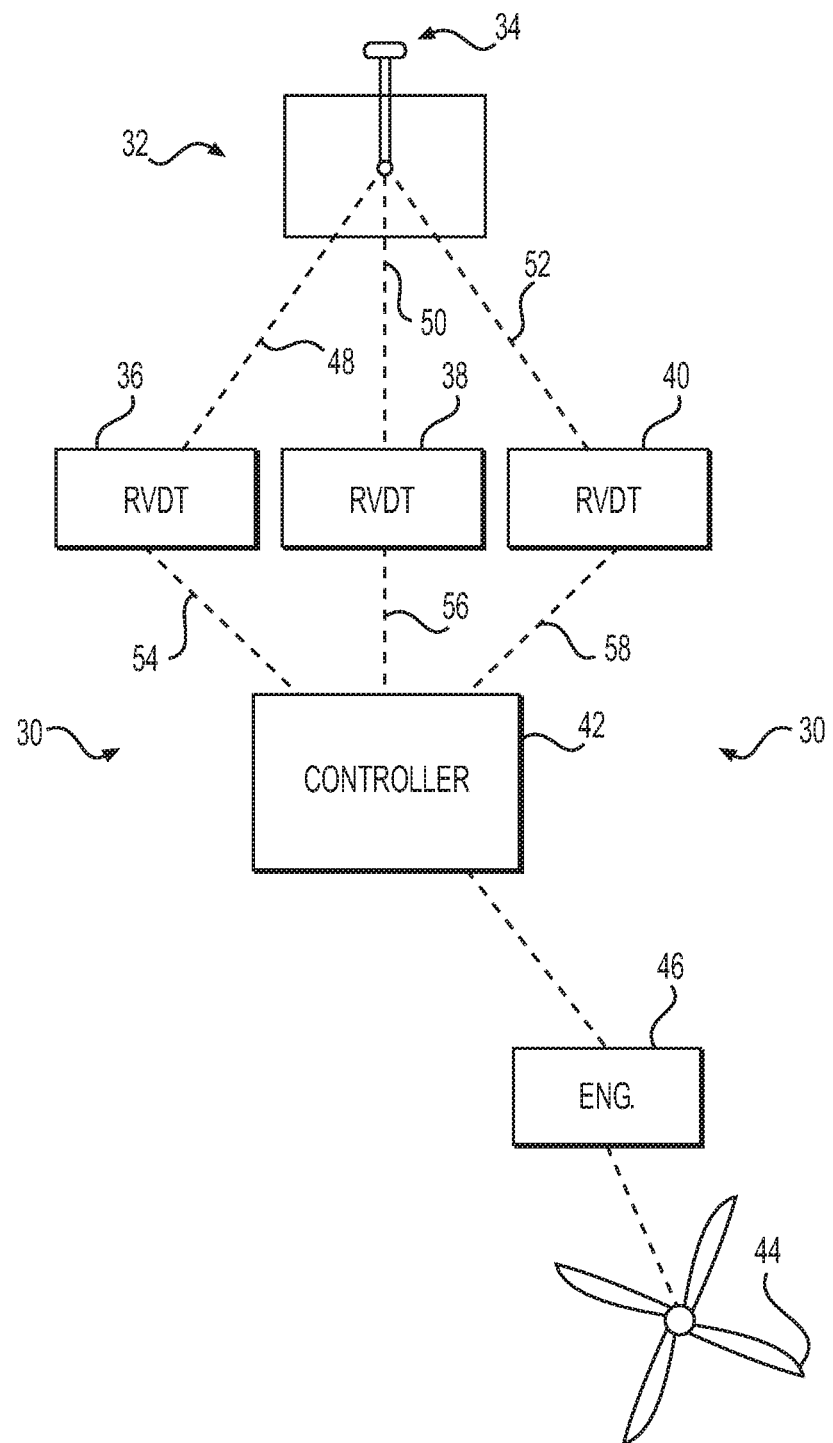
FIG. 3 shows a system diagram for an embodiment for a system environment for a single-stick throttle system like the embodiments described herein.

FIG. 3 shows an embodiment for a system embodiment 30 which enables the use of a single throttle lever control block 32, in embodiments, for a turboprop aircraft. As can be seen, the control block 32 includes a single lever 34 which will be the sole user interface required for controlling engine speed, propeller pitch, and thus, thrust. Mechanical input is received from lever 34 independently into a first, a second, and a third RVDT, 36, 38, and 40 respectively. Electronic signals from RVDTs 36, 38, and 40 are fed into a single controller 42. The controller 42, in embodiments, can be a FADEC system. Controller 42 has been configured to accommodate both controls relating to the pitch of an aircraft propeller, as well as fuel intake and other control information necessary to operate a gas turbine 46.

It should be noted, that the technologies discussed herein could be incorporated into systems involving the control of an automatically controlled piston-engine aircraft (with or without the incorporation of a FADEC). Further, the system could be implemented on engine-driven aircraft where pitch-control is not executed. Thus, the disclosures herein should not be limited only to implementations into turboprops.

The mechanical connections between the single lever 34 and each of the RVDTs are completely independent from one another. For example, (i) a mechanical connection 48 between lever 32 and RFDT 36; (ii) a connection 50 between lever 32 and RVDT 38; and (iii) a connection 52 between lever 34 and RFDT 40; ensures that the other two RVDTs continue to operate as intended even if one of the other systems is jammed or otherwise fails.

The electronic connections (e.g., a signal pathway 54 from RVDT 36; a signal pathway 56 from RVDT 38, and a signal pathway 58 from RVDT 40) are also independent from one another into the controller 42. This means that if one RVDT is lost, signals from the other two will still be received.

The Throttle Lever in General

Figure 4:
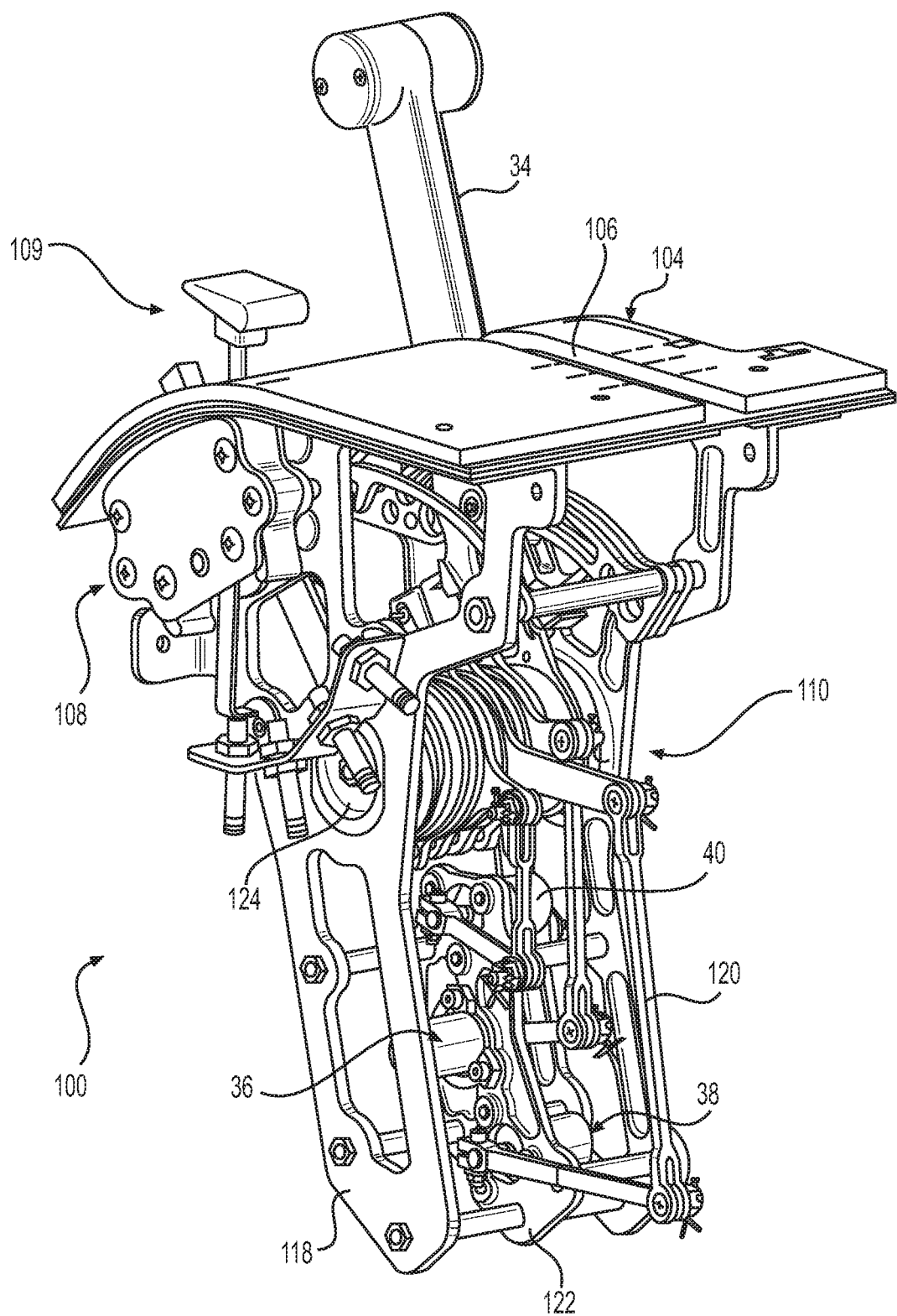
FIG. 4 is a perspective view showing a throttle stick embodiment as it appears removed from the control panel in the cockpit of an aircraft.
Figure 5:
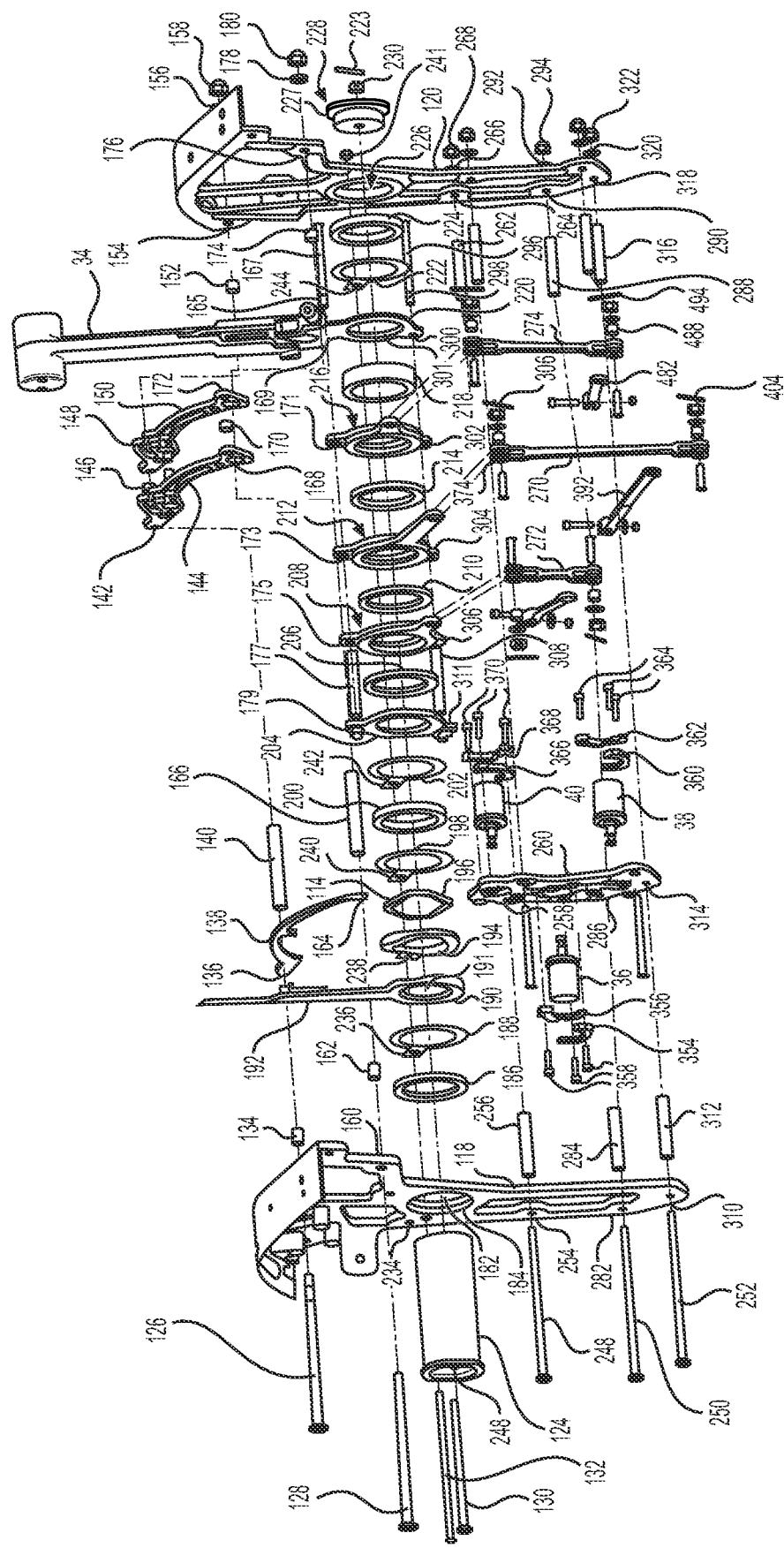
FIG. 5 is an exploded view showing the detailed components included in the throttle stick embodiment shown in FIG. 4.
Figure 6:
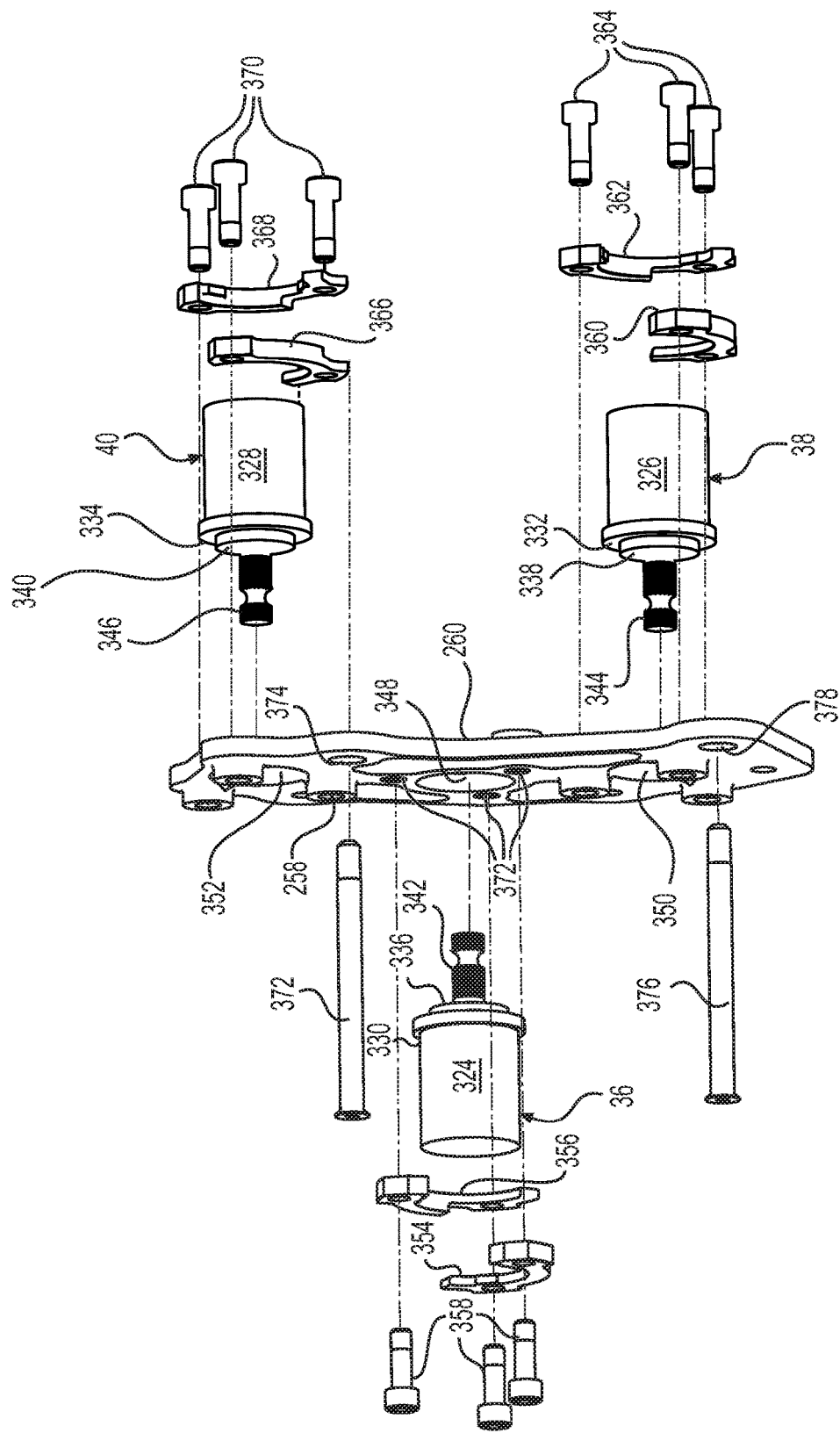
FIG. 6 is an exploded view showing the details of an RVDT subsystem associated with the throttle stick embodiment in FIG. 4.

Generally, referring to FIG. 4, the system of the disclosed embodiment includes a throttle lever 102 which extends down through a slot 106 created in a cover plate and LED panel assembly 104. A flap-lever assembly 108 also has a lever 109 which extends up through a slot in the cover plate and LED panel 104. The cover plate/LED panel assembly 104 has been removed in FIGS. 5, 6, 7, and 8 for the sake of simplicity. Throttle lever 102 is used to create forward or rearward axial rotation about an axial assembly 110. This axial rotation is used to create electronic readings by three redundant devices capable of measuring angular displacement, and outputting a signal. In the disclosed embodiment, these three redundant devices include a first RVDT 36, a second RVDT 38, and a third RVDT 40. Those skilled in the art will be familiar with RVDTs as being electromechanical transducers that, upon angular displacement of an input shaft, transmit an output voltage which is proportional to the displacement imposed. This voltage is then recognized by a computer supported or other sort of system which uses the voltage to create some response. In the field of aircraft, the response may involve control over the power input of the aircraft. The systems herein likely have numerous other applications in the transportation, gaming and other fields. Thus, the embodiment disclosed should not be an indication that the concepts are not applicable to numerous other applications.

Overall Throttle Lever Assembly

The system, except for the flap lever assembly 108, is mostly contained between side plates 118 and 120 using bolts. Side plate assembly 118 is substantially parallel to, displaced from, and opposes a second side plate assembly 120. The RVDT arrangement is substantially supported using a RVDT plate assembly 122. Lever assemblies are rotated about a stationary hub 124. These lever assemblies are part of a self-contained assembly that are rotated mechanically by the throttle lever 102. The first, second and third linking arms 270, 272, and 274, respectively, are used to independently drive each of RVDTs 38, 40, and 36 respectively, in a four-bar mechanical assembly.

Bolts 126, 128, 130 and 132 each pass through plates 118 and 120 and are secured by washers and nuts located outside of side plate 120. Bolt 130 secures stationary hub 124 and end cap 228 to the outer side plates 118 and 120. The friction lever, friction discs, friction cam, nested wave spring, drive spacers, lever assemblies and throttle lever are contained between the side plates 118 and 120 and rotate on stationary hub 124. The friction lever rail 138 and throttle lever detent rails 144 and 150 are contained between side plates 118 and 120 and held in place by bolts, spacers and nuts.

For example, a bolt 126 passes through hole made through side plate 118, then through a spacer 134, a hole 136 in a first side friction lever rail 138, a spacer 140, a hole 142 in a second throttle lever detent rail 144, a spacer 146, a hole 148 in right throttle lever detent rail 150, a spacer 152, a hole 154 in right side plate assembly 120, a washer 156 and finally is threaded into a nut 158 complete the containment of the plates 118 and 120 between the head and tip of bolt 126.

A bolt 128 passes through a hole 160 in side plate assembly 118, a spacer 162, a hole 164 in friction lever rail 138, a spacer 166, a hole 168 in lower part of a first throttle lever detent rail 144, a spacer 170, a hole 172 in the lower part of a second throttle lever detent rail 150, a spacer 174, a hole 176 in side plate assembly 120, a washer 178, and is threaded into a nut 180 to further the containment of the plates 118 and 120.

A bolt 130 is used primarily to secure a hub 124 about which the stick 102 and numerous other features will rotate about. In order to make the attachment, bolt 130 passes through an axial bore made through hub 124. Hub 124 is received through an aperture 182 made through side plate 118. A diametrically widened area 184 receives an outwardly extending ridge 185 on hub 124. On the other side of side plate 120, an end cap 228 closes out the stationary hub. More specifically, an aperture 226 made through the side plate assembly 120 receives therethrough a diametrically reduced section 227 of an end cap 228. End cap 228 is threaded into the stationary hub and secured using bolt 130, a nut 230 and cotter pin 232. This enables bolt 130, and cap 228 to secure and support all of components 186, 188, 190, 192, 194, 196, 198, 200, 202, 204, 206, 208, 210, 212, 214, 216, 218, 220, 222, and 224 together on the hub 124 such that they are rotatable on the hub 124.

Components 186, 188, 190, 192, 194, 196, 198, 200, 202, 204, 206, 208, 210, 212, 214, 216, 218, 220, 222, and 224 are ring-like devices. First, an RVDT drive spacer 186 is mounted on the hub 124, as are friction disc 188, an aperture 190 made through the lower end of a friction lever assembly 192, a friction cam 194, a nested wave spring 196, a friction disc 198, a spacer 200, a friction disc 202, a clamp assembly 204, a spacer 206, a first RVDT lever assembly 208, a RVDT drive spacer 210, a second RVDT lever assembly 212, a RVDT drive spacer 214, a third RVDT lever assembly 216, a RVDT spacer 218, an aperture 220 made through a lower portion of the throttle lever assembly 102, a friction disc 222, and a RVDT drive spacer 224.

Drive Levers are Made to Be Independent from Friction Equipment

In operation, the friction lever 192 is adjustable such that the lever 34 can be given selective resistance. Although friction lever 192 is rotatable on the hub 124, and is unlinked relative to the other discs mounted on the hub 124, it's rotation is what can create or remove friction. To do this, the lower portion 191 of the friction lever 192 has a cam profile that, when rotated, cooperates with a corresponding cam surface existing on friction cam 194 to create expansion of most of the discs on the hub 124. Friction cam 194 is rendered relatively stationary by a friction-disk linking bolt 132. Friction-disc linking bolt 132 is in parallel with bolt 130, but has an axis that is spaced apart therefrom, and is used primarily to secure the friction cam 194 and the friction discs 188, 194, 198, 202, and 222 (on opposite side of lever 34) in the system from rotating along with the friction lever 192, or along with the throttle lever 34. More specifically, bolt 132 travels through an aperture 234 made in the side plate 118, an aperture 236 in friction disc 188, aperture 238 made through friction cam 194, aperture 240 made through friction disc 198, aperture 242 made through friction disc 202, aperture 244 made through friction disc 222, and then is secured on an opposite end by a nut 246. Thus, the friction discs remain stationary against rotation about the hub 124. When lever 192 is moved forward, all of the disk components outside of a friction-exempting subsystem (which includes components existing between bearing clamp 204 and the inside face of the throttle 34 where is mounted on the hub 124) are compressed.

This arrangement enables the pilot to loosen friction to free throttle movement, and also to increase friction to avoid the lever from creeping, or even lock the lever in place so that the pilot can address other hand worked controls in the cockpit.

But the excepting subsystem avoids the friction created or released for the RVDT drive lever assemblies 208, 212, and 216. Bolts 167 and 298 extend through throttle lever assembly 102 and the hole sets established in each drive lever (holes 171, 173, 175, on the upper portions, and holes 302, 304, and 306 in the lower portions) transfer the rotation of the throttle lever 34 to all three of the drive levers 208, 212, and 216. Drive levers 208, 212, and 216, during this movement, are excepted from the friction by upper and lower spacers 177 and 308. Spacers 177 and 308 extend between this inside surfaces of bearing clamp 204 and the inside surfaces 301 of ring at the bottom of the throttle where it is mounted on the hub 124. When compression (and thus friction) is created by the friction lever 192 as discussed, the spacers 177 and 308 compress against the clamp 204 and the throttle ring surfaces 301. Thus, because the spacers 177 and 308 guarantee a defined distance between the throttle lever assembly 34 (surface 301) and the clamp assembly 204, the three RVDT lever assemblies 208, 212, and 216 are shielded from the friction. The defined friction-free space created allows the RVDT levers to act independently from the friction created outside of this defined space.

RVDT Housing Assembly

Bolts 248, 250 and 252 pass through side plates 118 and 120 and, along with spacers 316, 288, 296, 262, 256, 284 and 312 and the corresponding bolts, washers and nuts, secure the RVDT plate assembly to side plate 120. Thus, the RVDTs 36, 38, and 40 in place, but are also mechanically connected in an arrangement enabling a breakaway assembly designed to avoid mechanical jams that impede the functionality of the lever-driven RVDTs 36, 38, and 40.

A bolt 248 initially passes through an aperture 254 made through side bracket 118, then through a spacer 256, then through an aperture 258 formed through a RVDT plate assembly 260. After that, bolt 248 is received through a spacer 262, then an aperture 264 formed through side bracket 120, where it is secured by a washer 266 and nut 268.

A bolt 250 passes through an aperture 282, then through a spacer 284, then through an aperture 286 formed through a mid-lower portion of the RVDT plate assembly 260. Bolt 250 then is received through spacer 288, then through an aperture 290 through the lower end of the side bracket 120, and finally is secured using a washer 292 and a nut 294.

A bolt 252 passes through an aperture 310 made through the lower end of bracket 118, then through a spacer 312, then through an aperture 314 made through the bottom of the RVDT plate assembly 260, then through a spacer 316, then through an aperture 318 formed through the bottom of the side bracket 120, where it is secured using a washer 320 and a nut 322.

The RVDT system subassembly centers around the RVDT plate assembly 122 (FIG. 4) which secures the first, second, and third RVDTs 36, 40, and 38. First, second, and third RVDTs 36, 40, and 38 each have: (i) cylindrical outside surfaces 324, 326, and 328; (ii) outwardly extending rims 330, 332, and 334; (iii) passthrough outcropped portions 336, 338, and 340; (iv) and splined shaft 342, 344, and 346, respectively. The forwardly-extending rod portions 342, 344, and 346 each extend through corresponding holes 348, 350, and 352. Portions 336, 338, and 340 each fit cylindrically inside each hole, and the outwardly extending rims 330, 332, and 334 bears against the periphery of each hole the RVDTs are being inserted into, and from behind. Overlapping crescent matching pairs 354 and 356, 360 and 362, 366 and 368, are installed using bolts 358, 364, and 370 which are secured into threaded receptacles onto each side of the RVDT plate assembly 260. The threaded receptacles 372 that receive bolts 358 are shown on the exposed side of the RVDT plate assembly 260. It should be understood that a similar arrangement exists on the back side of plate 260 for each sets of bolts 364 and 370.

Drive Levers

Lever assemblies 208, 212, and 216 drive levers are rotated along with movement of the throttle lever 102. To do so, a threaded bolt 167 is inserted through a hole 169 at a location above the axis of rotation of the throttle lever about the hub 124. Bolt 167 then passes through apertures 171, 173, and 175 and is also received into a sleeve-spacer 177

(which will form the bearing surface inside the apertures), and a threaded end 165 is then screwed into a receiving nut 179 to link all of the lever assemblies together for common rotation upon movement of the throttle lever 102. This arrangement is made more secure by a bolt 296 which has threads 298. The bolt 296 passes through lower aperture 300 on throttle lever assembly 220, then passes through apertures 302, 304, 306, at the bottom of each of lever assemblies 208, 212, and 216, is received within sleeve spacer 308 and then the threaded head 298 is screwed into a receiving nut 311 to secure the bolt 296, complete securement, and reinforce the common rotation of the lever assemblies 208, 212, and 216 from below.

Independent Linkage Systems Between the Drive Levers and the RVDTs

Figure 7:
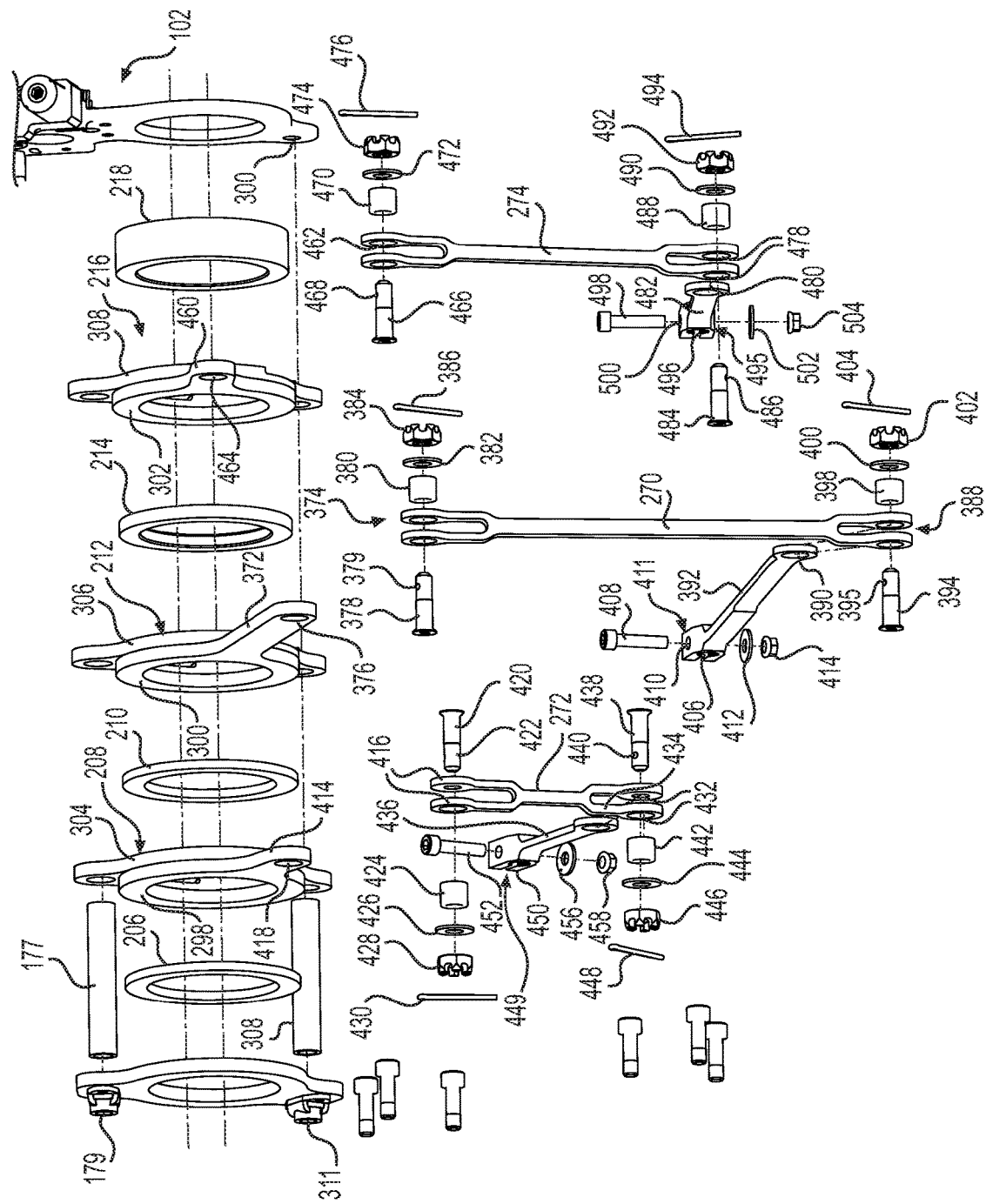
FIG. 7 is an exploded view showing the details of a linking arm subsystem associated with the throttle stick embodiment in FIG. 4.
Figure 8:
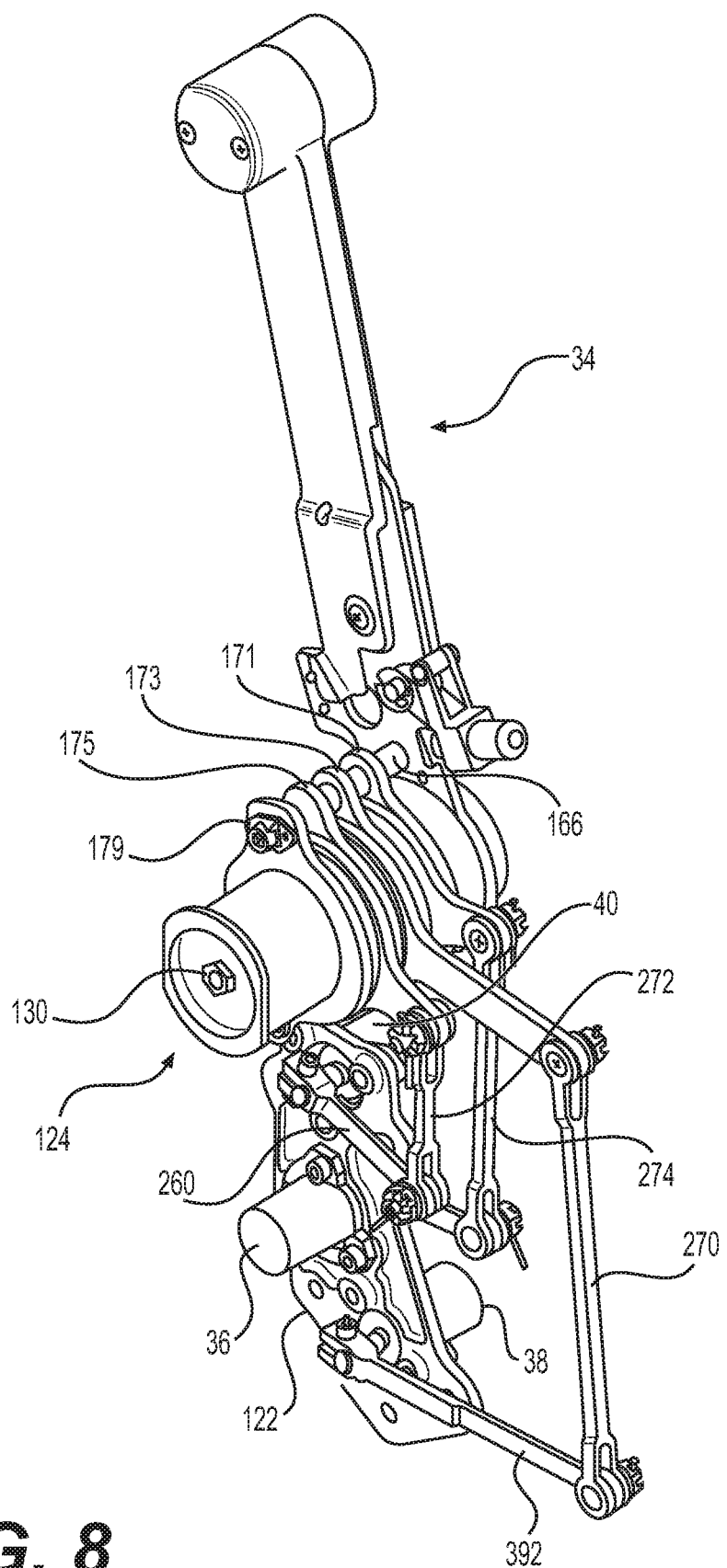
FIG. 8 is a stripped-down perspective view of the throttle stick embodiment of FIG. 4.

The top of each of the three link arms 270, 272, and 274, shown in FIG. 7, are all independently connected about the rotating mechanisms and mechanical connections that actuate RVDTs 36, 38, and 40 respectively.

A first linking arm 270 is attached at the top to an outwardly-extending drive arm 372 on drive assembly 212. Aligned eyelets 374 at the upper end of link arm 270 line up with an aperture 376 made though an outer portion of the drive arm, enabling a bolt 378 with a cross bore 379 at its tip to pass through and be secured by a spacer 380, washer 382, and nut 384 when cross pin 386 is installed.

At a lower end of first link arm 270, a similar arrangement including aligned eyelets 388 line up with an aperture 390 made though an outer end of a driver arm 392. Again this connection is made using a bolt 394 with a cross bore 396 at its tip to pass through and be secured by a spacer 398, washer 400, and nut 402 when cross pin 404 is installed.

An inner end 411 of driver arm 392 includes an opening 406 adapted to receive the splined shaft end 342 of RVDT rod end 38. The end 342 is secured in the opening 406 using a bolt 408 that is received into aligned crosswise holes 410 and secured by a washer 412 nut 414 arrangement.

A second link arm 272 is attached at the top to an outwardly-extending drive arm 414 on drive assembly 208. Aligned eyelets 416 at the upper end of link arm 272 line up with an aperture 418 made though an outer portion of the drive arm, enabling a bolt 420 with a cross bore 422 at its tip to pass through and be secured by a spacer 424, washer 426, and nut 428 when cross pin 430 is installed.

At a lower end of the second link arm 272, a similar arrangement including aligned eyelets 432 line up with an aperture 434 made though an outer end of a driver arm 436. Again this connection is made using a bolt 438 with a cross bore 440 at its tip to pass through and be secured by a spacer 442, washer 444, and nut 446 when cross pin 448 is installed.

An inner end 449 of driver arm 436 includes an opening 450 in adapted to receive the splined shaft end 344 of RVDT rod end 40. The end 344 is secured in the opening 450 using a bolt 452 that is received into aligned crosswise holes 454 and secured by a washer 456 nut 458 arrangement.

A third link arm 274 is attached at the top to an outwardly-extending drive arm 460 on drive assembly 216. Aligned eyelets 462 at the upper end of link arm 274 line up with an aperture 464 made though an outer portion of the drive arm, enabling a bolt 466 with a cross bore 468 at its tip to pass through and be secured by a spacer 470, washer 472, and nut 474 when cross pin 476 is installed.

At a lower end of the third link arm 274, a similar arrangement including aligned eyelets 478 line up with an aperture 480 made though an outer end of a driver arm 482. Again, this connection is made using a bolt 484 with a cross bore 486 at its tip to pass through and be secured by a spacer 488, washer 490, and nut 492 when cross pin 494 is installed.

An inner end 495 of driver arm 482 includes an opening 496 adapted to receive the splined shaft end 346 of RVDT rod end 36. The end 346 is secured in the opening 496 using a bolt 498 that is received into aligned crosswise holes 500 and secured by a washer 502 nut 504 arrangement.

Rivets Connecting the Driver Halves are Designed to Fail

Figure 9:
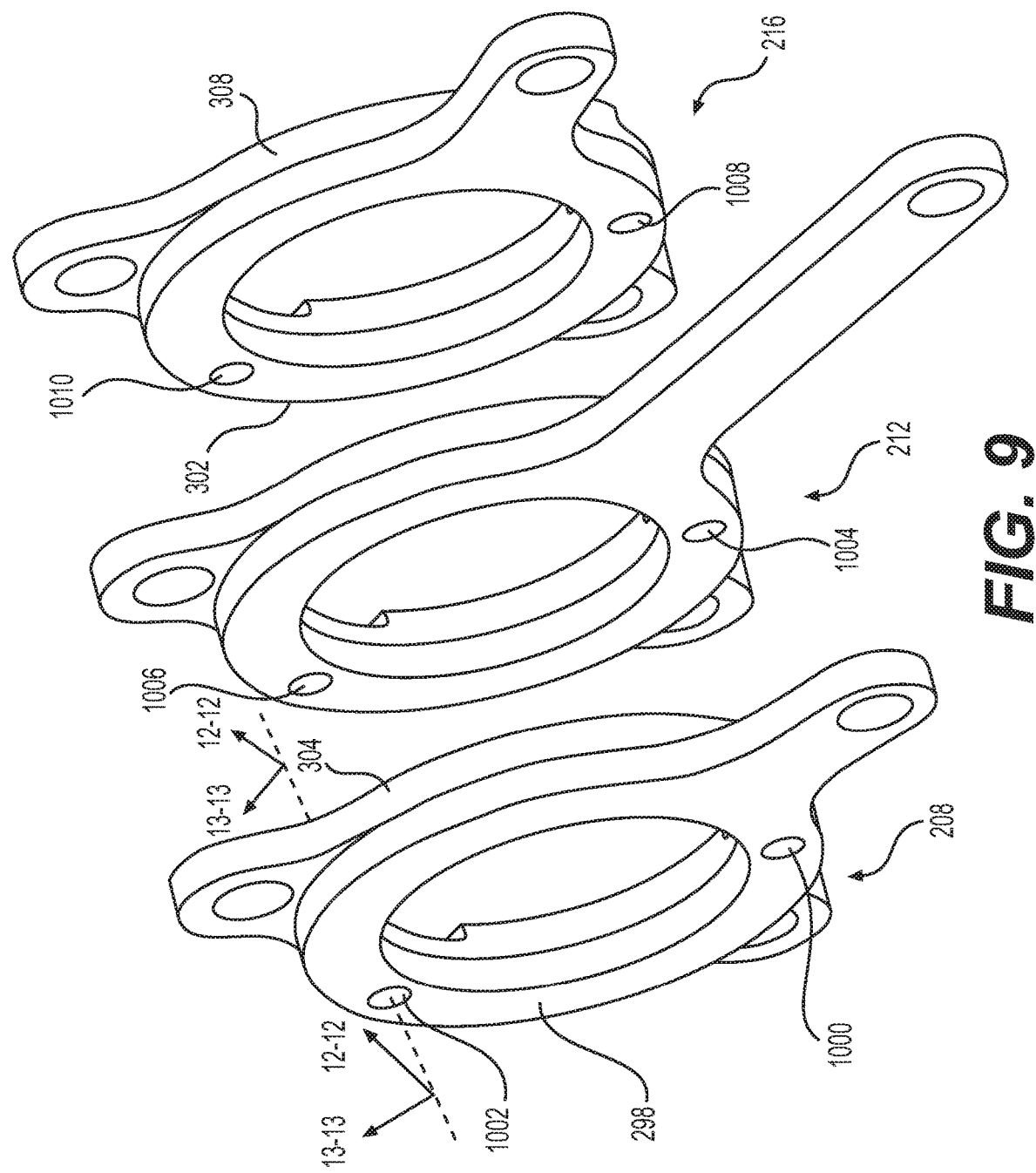
FIG. 9 is a perspective view showing the three drive levers used in an embodiment of the system revealing the front of each lever.
Figure 10:
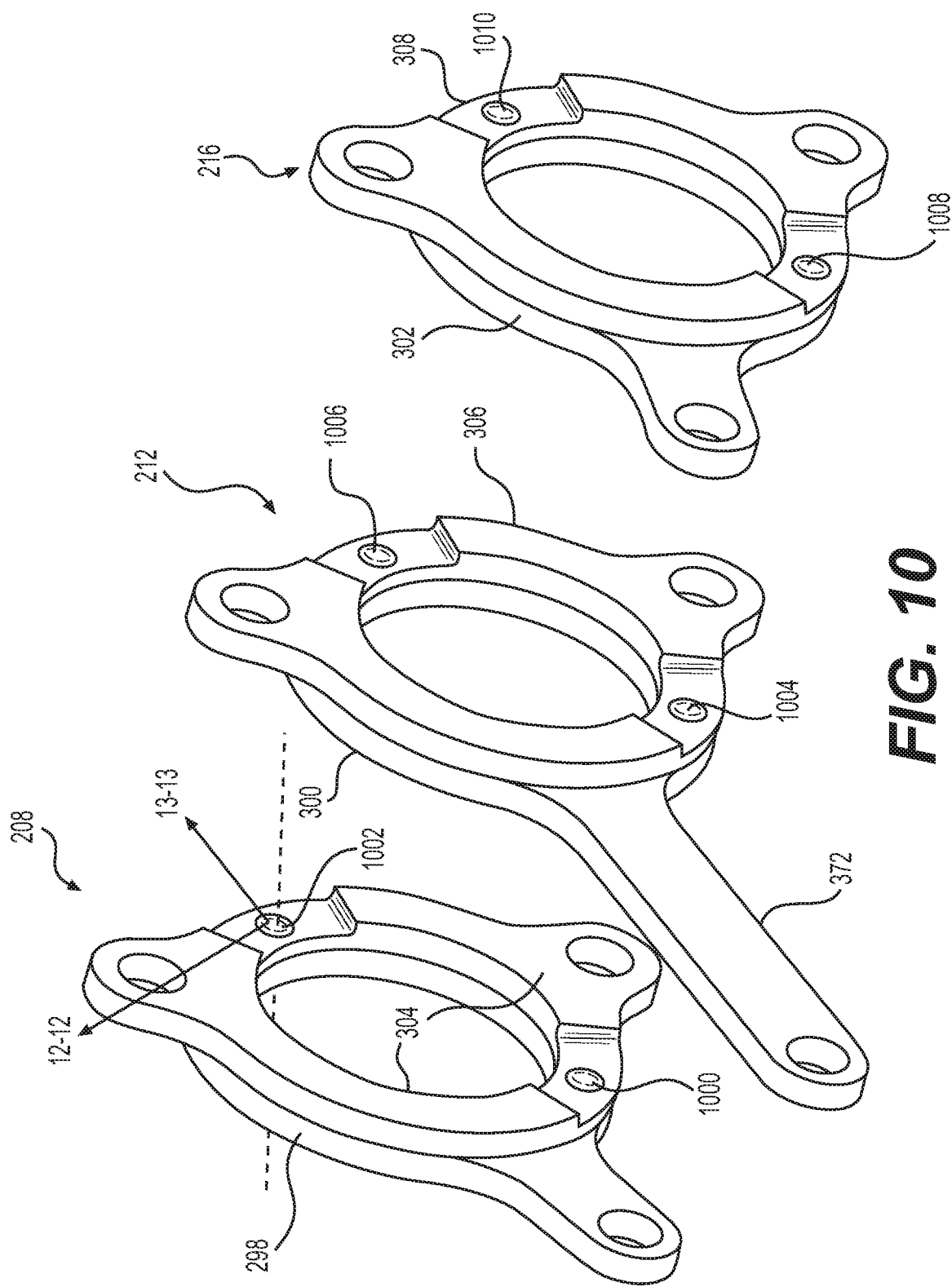
FIG. 10 is a perspective view showing the three drive levers from a different perspective.
Figure 11:
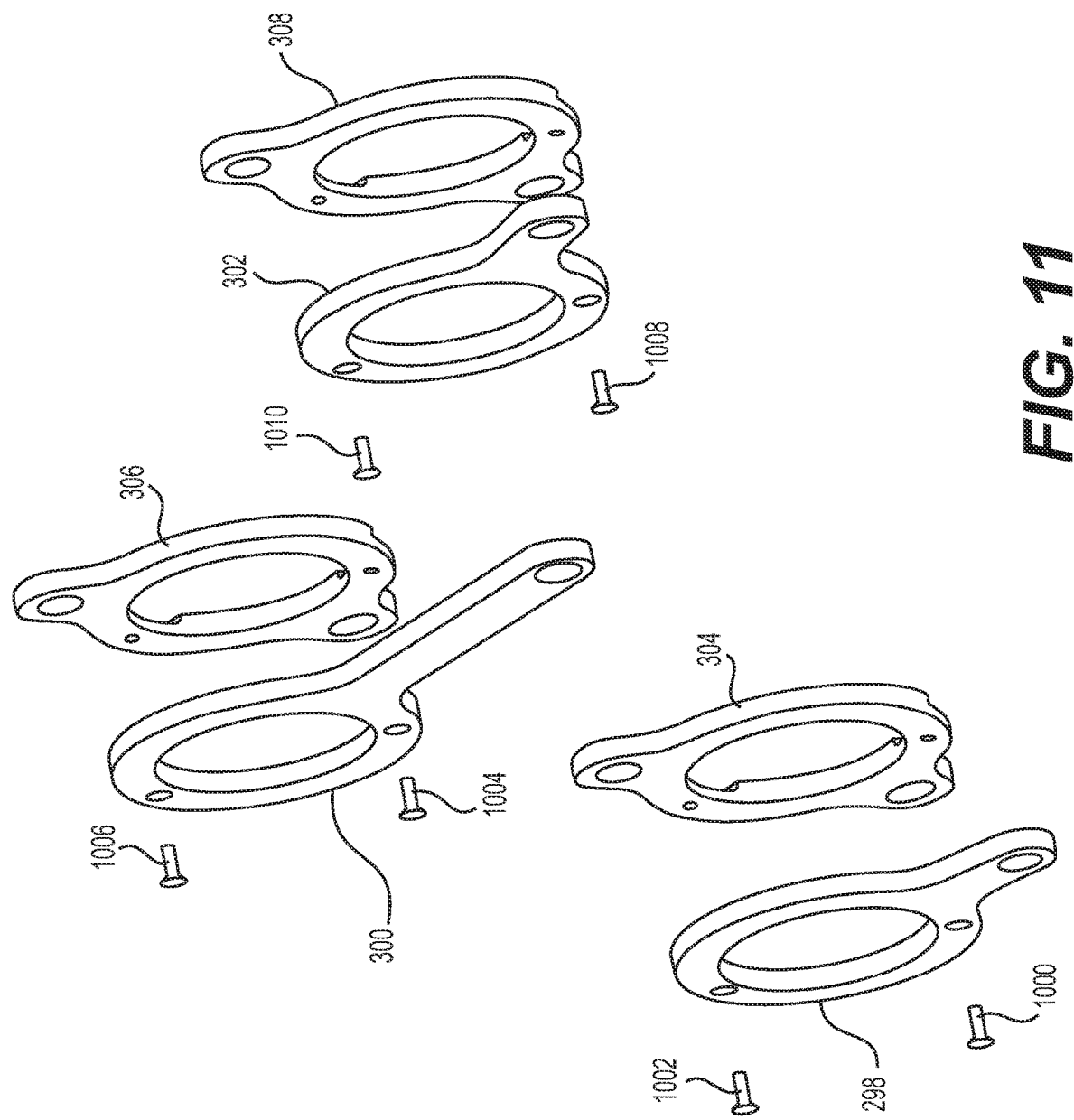
FIG. 11 is a view from the same perspective as in FIG. 9, but with the levers shown exploded such that fastening mechanisms can be seen in detail.

The drive levers, 208, 212 and 216, in an embodiment, are comprised of rivet connected lever halves 298, 300, and 302, and opposing halves 304, 306, and 308 respectively. As can best be seen in FIGS. 9-12, the soft rivets 1000, 1002, 1004, 1006, 1008, and 1010 used to secure together each half pairs 298/304, 300/306, and 302/308. FIGS. 9 and 10 show the pairs from different perspectives so both sides can be seen. FIG. 11 shows the rivets before they have been flattened to cause the connection of the pairs. The rivets are designed to shear if one of the lever arms or RVDT's would become jammed. More specifically, the existence of a jam occurring in the mechanical system between each drive lever and it's respective RVDT will cause back shear pressure against the rivets. The shearing of any one rivet, e.g., due to back pressure due to a jam, allows the remaining still-functional levers to rotate about the stationary hub and allowing the throttle quadrant to continue to operate in transmitting two of the three readings from the two unaffected RVDTs.

Figure 12:
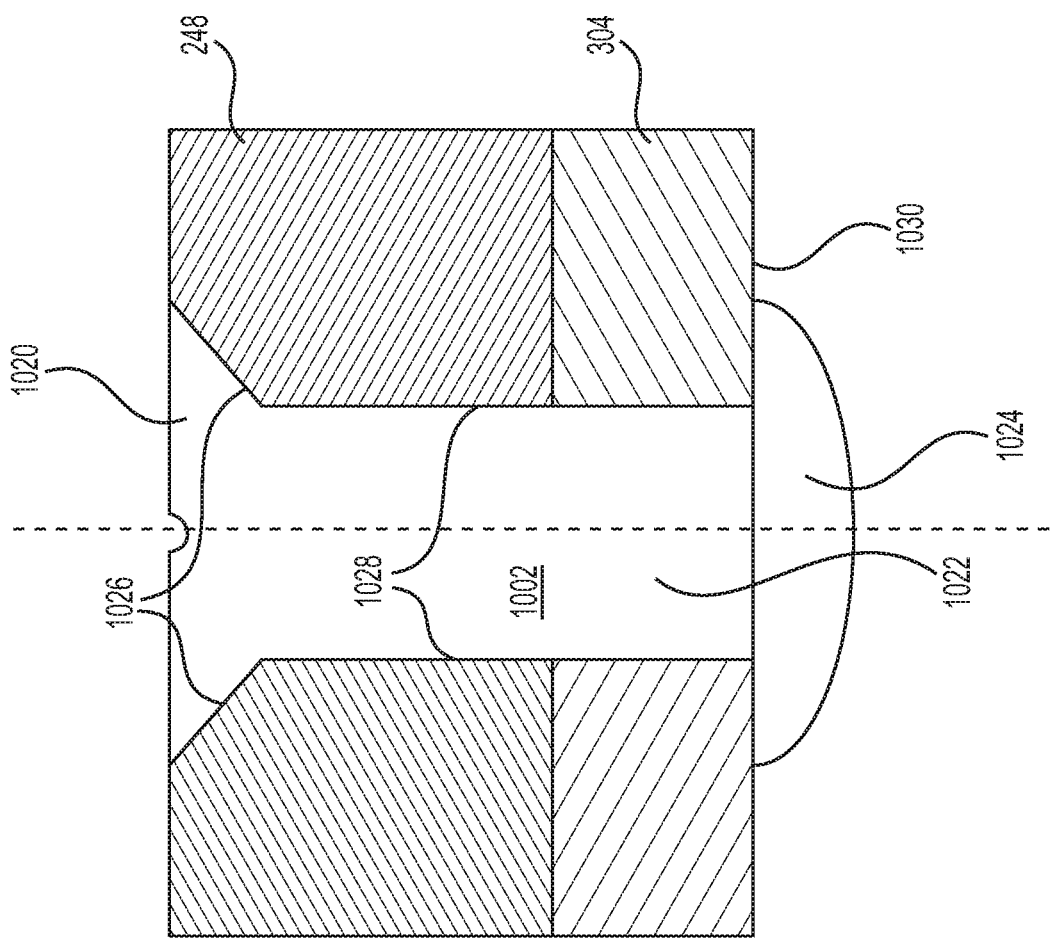
FIG. 12 is a cross sectional view taken from Section 12-12 in FIG. 9.
Figure 13:
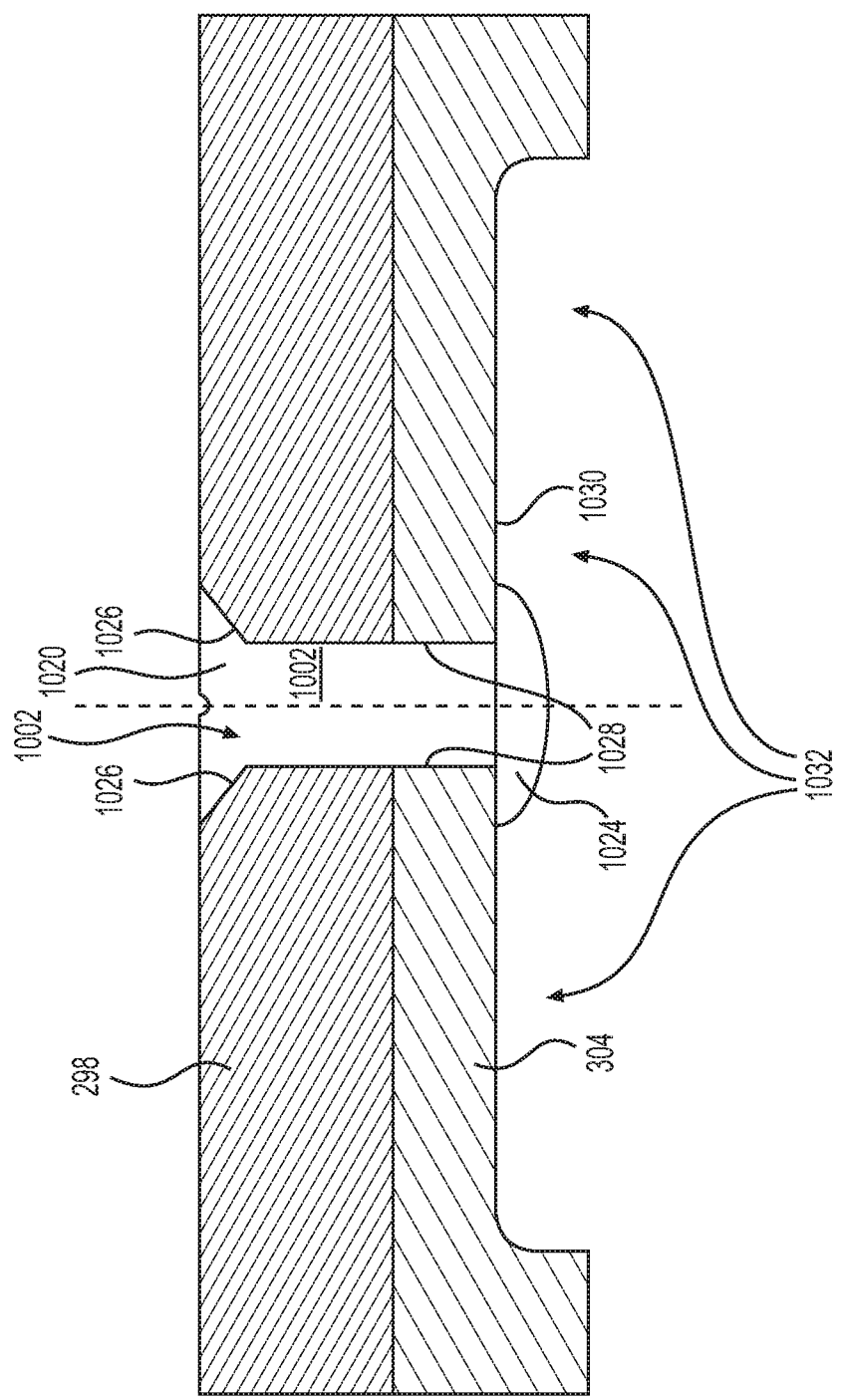
FIG. 13 is a cross sectional view taken from Section 13-13 in FIG. 9.

The specifics regarding each rivet are shown in FIGS. 12 and 13. Although the example chosen for depiction is rivet 1002 used to connect together halves 298 and 304 of drive lever 208, it should be understood that these cross sections would be substantially the same for all the other rivets (rivets 1000, 1004, 1006, 1008, and 1010). Referring first to FIG. 12, which is taken from Section 12-12 in FIG. 9, it can be seen that the rivet includes a head 1020, a shaft 1002, and a through end 1024. Those skilled in the art will recognize that a rivet connection is completed upon the flattening of the through end against a surface (e.g., surface 1030) on the other side from which it was inserted. In the disclosed embodiment, a countersunk area 1026 defined into the half 298 is shaped to receive head 1020. Rivet shaft 1002 is received through aligned holes 1028 bored through both halves 298 and 304. FIG. 13, which is taken from Section 13-13 in FIG. 9, shows a recessed area 1032 which is designed to account for the flattened head 1024 which will result from the processed rivet 1000.

Voting Process

Figure 14:
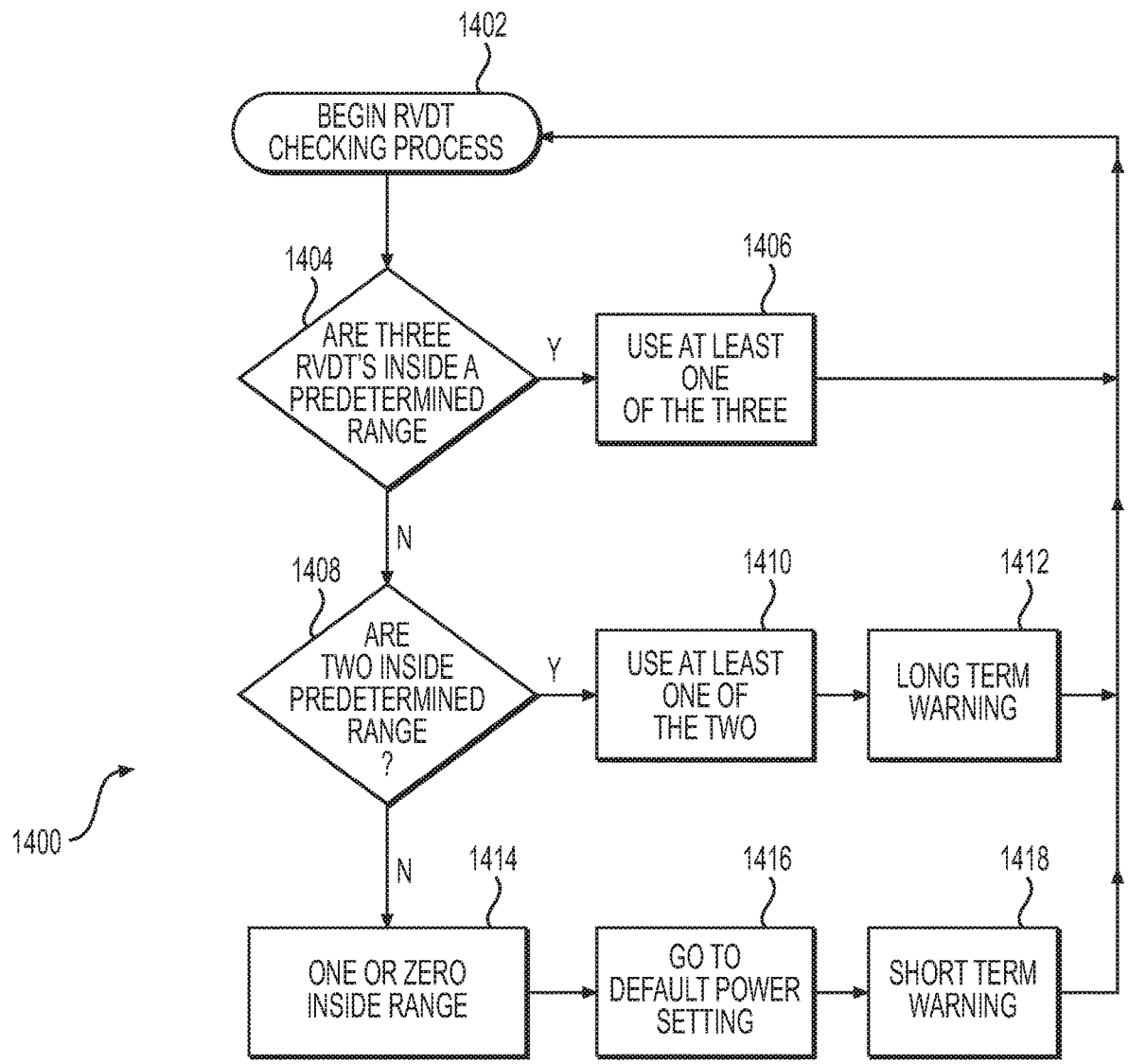
FIG. 14 is a flow diagram showing, for an embodiment, the processes included in an RVDT voting process.

A voting process is also disclosed whereby the RVDTs are analyzed for accuracy. FIG. 14 shows one embodiment as a process 1400. In a first step 1402 the process starts and then moves on to a query step 1404 where it is determined whether the readings from any of RVDTs 36, 38, or 40 are inside of a predetermined angular range (e.g., +/−40 degrees) of rotation from one another. If the three RVDT readings are all within the range, it is a preliminary indication of proper functionality, e.g., an indication that the mechanical and other systems relating to the RVDTs are operating property. If this is the case, the process, in embodiments, uses any one of the three RVDT readings. In some embodiments, the RVDT value of the three is selected at random. In other embodiments, the RVDT with a middle value is picked. In still further embodiments, an averaging is done. Regardless, after step 1406 the process then loops back to start 1402 so that the whole process can be continually repeated.

If in step 1404 one of the RVDT values (for RVDTs 36, 38, and 40) is outside of the predetermined range (an indication of a mechanical or other problem for that RVDT), the process moves on to a step 1408. In step 1408 a determination is made as to whether two of the RVDT values coming from RVDTs 36, 38, or 40 are inside the predetermined range. If so, the tight values are an indication of proper functionality of the two, e.g., indicating that the mechanical and other systems supporting those two RVDTs are operating properly. Thus, the process next, in a step 1410, uses the value of one of the two in-range RVDTs to establish the lever position. And since the status of the out-of-range RVDT has been called into question, in a next step 1412, a long term warning is generated. In some embodiments, this might be a crew-alerting system (CAS) warning, e.g., a white CAS message, which alerts the pilot and others that the system should be checked, not immediately, but at some maintenance time in the future. After that, the process loops back to start 1402.

If, however, in step 1404, there are not two RVDTs inside the predetermined range, the process moves on to a step 1414 where one or none of the RVDTs are in the range. When in this situation, the processing component will, in a step 1416, go into a default power setting (e.g., idle if the aircraft is on the ground, cruise if in the air). Also, the processing component transmits a short term warning indicating that the problem should be fixed more immediately (e.g., an amber CAS message). Then the process again loops back to start 1402.

Figure 15:
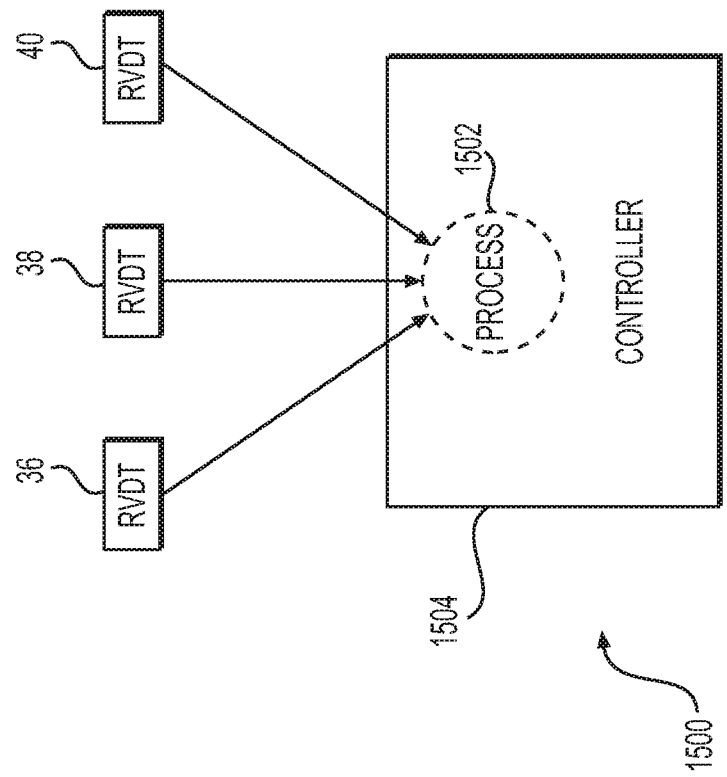
FIG. 15 shows a schematic for a system embodiment for an environment in which the processes of FIG. 14 might be executed.

FIG. 15 shows a system environment 1500 wherein the steps shown in FIG. 14 are executed by a module 1502 operating on controller 1504 (which would be the same as controller 42 shown in FIG. 3). Module 1502 listens to the RVDT outputs, and responsively operates the continually looped steps shown in FIG. 14. In embodiments, controller 1504 could be any number of computing devices or programmable logic controllers. In the disclosed embodiment, the controller 42 is a FADEC.

Figure 16:
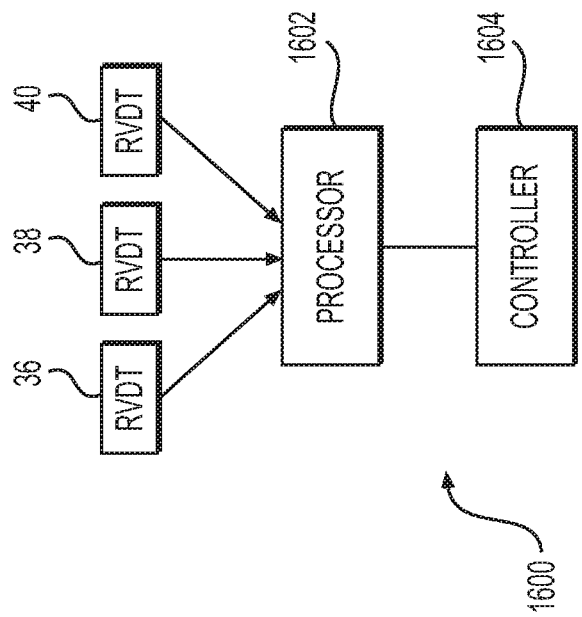
FIG. 16 shows an alternative system embodiment to the one shown in FIG. 15.

FIG. 16 shows an alternative system environment 1600 in which the process described in FIG. 14 might be executed. As can be seen in the figure, each of RVDTs 36, 38, and 40 are electronically connected into a processor 1602. The processor 1602 listens to the RVDT outputs, and continuously executes each of the steps, and communicates any necessary commands to the controller (e.g., FADEC) 1604.

Alternative Embodiments

Figure 17:
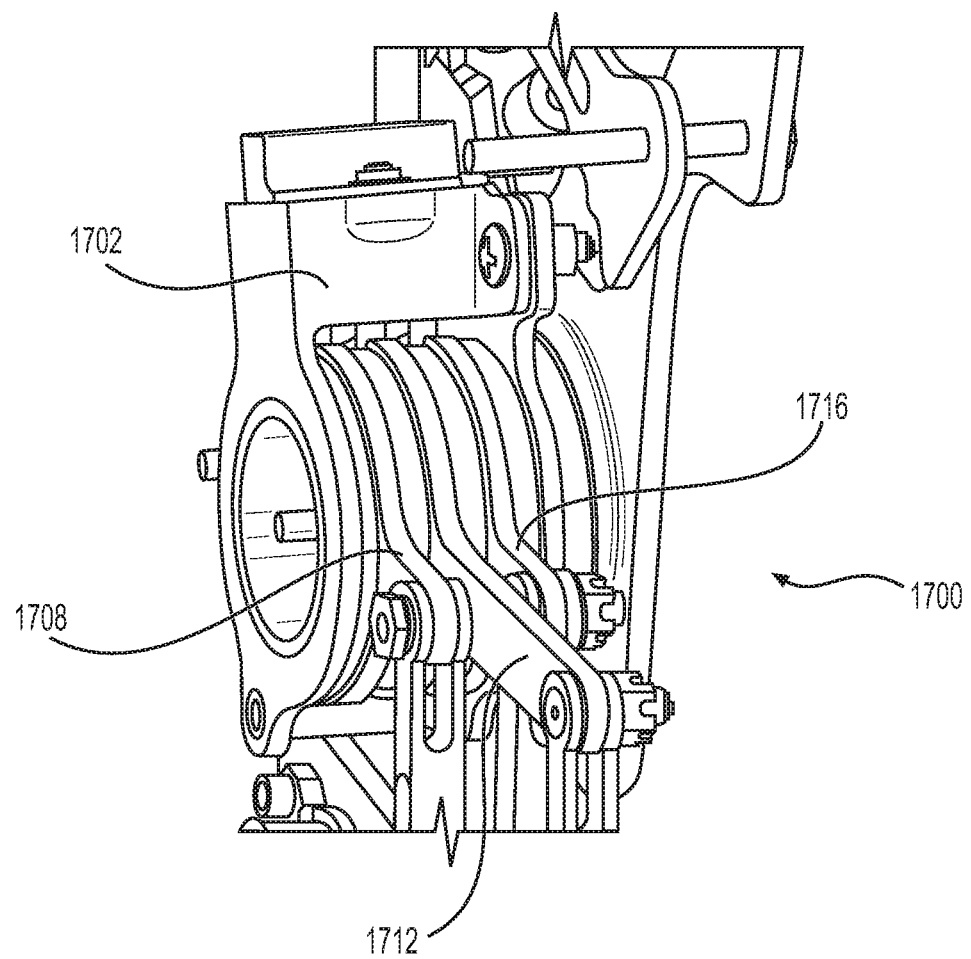
FIG. 17 is a perspective view showing a ball-plunger alternative embodiment.
Figure 19:
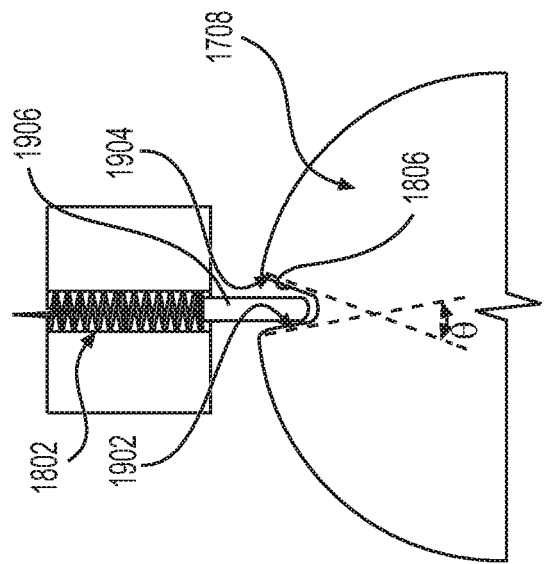
FIG. 19 shows a cross-sectional view revealing the ball-plunger system at the pin.
Figure 18:
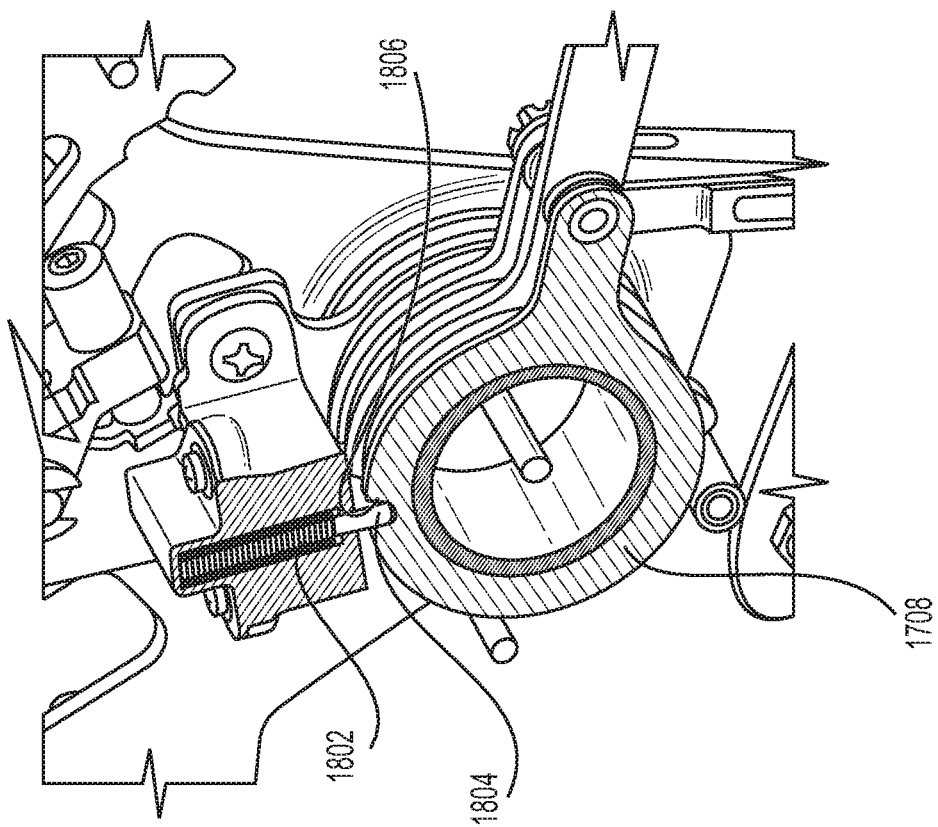
FIG. 18 shows a section taken out of a perspective view of the ball-plunger arrangement wherein the internals are revealed.

Other embodiments are possible. For example, a first alternative embodiment is shown in FIGS. 17-19. These figures show a system where, instead of using the shear rivets in the disc buildup, a series of ball plungers are used that would be located above the drive levers, 1708, 1712 and 1716 (see FIG. 17, each of the drive levers would ordinarily rotate with the throttle stick). Drive levers, 1708, 1712 and 1716 are mostly like the drive levers 208, 212 and 216 already shown, except that instead of rivet arrangements, these drive levers include detents at the top. The detents at the top of each drive lever are each used to receive ball plunger arrangements. One ball plunger arrangement exists for each detent atop each of the drive levers. Referring the perspective view of FIG. 17, the three ball plunger arrangements (not shown) are included in a ball plunger housing 1702. FIG. 18 is a section taken to reveal the details for drive lever 1708 (and substantially identical arrangements exist for each of the other drive levers 1712 and 1716). It can be seen that a ball plunger 1802 includes a tip 1804 which is received into a detent 1806. The details regarding detent 1806 can be seen in detail in FIG. 19.

Each ball tip (e.g., tip 1804) nests into the detent of each of the drive levers. The force of the ball plunger into the detent is what engages the disc-portion of the drive levers to rotate around the hub when the throttle lever is rotated, thus ordinarily rotating the RVDT. But when abnormal resistance is encountered (indicative of a mechanical jam), the spring force of the ball plunger will be overcome, and the tip (e.g., tip 1804) rises up out of the detent (e.g., detent 1806) releasing the drive lever (e.g., drive lever 1708). In case of a RVDT jam, the abnormally high side force on the rotating throttle lever would overcome the force in the ball plunger for and create a disengagement.

In order to avoid disengagement upon resistance existing at levels below what would occur with a mechanical jam, the angle existing between walls 1902 and 1904 (Ø); and the end force (F) (a/k/a spring force). The threshold side force (TSF) is what needs to be determined to prevent unwanted disengagement. The determination can be made, given a known Ø or after selecting a given ball plunger having a given F value. The following equation: $TSF=F/\tan(Ø/2)$ can thus be used to solve for Ø or for F, depending on which is the remaining variable. The value for F for each ball plunger can be uncovered from known data, specifications, or tables for F values for ball plungers. Using a system environment described herein already as an example, a jammed RVDT would allow the drive lever to remain stationary while the rest of the assembly would still rotate and operate normally, allowing for the continued function of the remaining two RVDTs.

A second alternative embodiment involves using frangible links being created for each of the outwardly extending portions 414, 372, and 460, of each of the drive levers 208, 212, and 216. See FIGS. 5 and 7. The idea is that each of these links would be created such that they would break whenever a RVDT or linkage jam would occur. The links might be made to be frangible in a variety of ways. First, a joint can be defined into the middle each of the RVDT link arms (E.g., first, second and third linking arms 270, 272, and 274 shown in FIG. 8). The joint would be created as a locations of relative structural weakness in the arms. Thus, upon a jam, the jammed linking arm (one of first, second, and third linking arms 270, 272, and 274) would break if a jam occurred in the mechanical system of that arm. Like in other embodiments, the joint securement could be made using a rivet or other attached material that would break under a predetermined load.

Alternatively, the ends of the RVDT link arms (e.g., and third linking arms 270, 272, and 274) where the bolts attach to the arms (referring to FIG. 7, end 374 of arm 270, end 416 of arm 272, and end 462 of arm 274) could be made frangible where they join up with the lever arms 372, 414, and 460 respectively. This could be done using some form of frangible links, or using some other means of failure at the arm/lever junction. Alternatively, the drive lever arms themselves (e.g., drive lever arms 327, 414, and 460) could be configured as the weak mechanical component, and designed to fail upon the implementation particular torque.

Further still, the opposite ends 388, 432, and 478 of arms 270, 272, and 274, respectively, could also be designed to fail. This could also be done using frangible links.

An additional alternative embodiment is similar to those above, but instead of using frangible links, the bolts 420, 378, and 466 (see FIG. 7) used to make the connections at the end of each of drive levers 208, 212, and 216 are designed to fail. For example, they can be created as shear bolts. And the same is true for the connections made by bolts 394, 438, and 484. In each instance, a shear bolt would be selected such that it would shear at a predetermined load.

An additional embodiment might involve making each of the drive lever disks 212, 216, and 218 force fit onto the outer cylindrical surfaces of the hub the drive An option was to somehow make the a slip disc on the hub 124 such that they would slip upon a particular torque.

A further alternative embodiment involves using pressure plates as part of the hub with a new design for the RVDT drive levers. Referring to the embodiment shown in FIGS. 3-16, the RVDT lever attachments would be designed with one side having geared teeth that would mate with a spring-loaded plate. The spring-loaded plate would slip when the load on the RVDT lever attachment approached a designed limit.

A further alternative embodiment works for a RVDT jam or failure only and not for a drive linkage failure. This option puts the breakaway mechanism at the RVDT shaft. In the event of an RVDT jam or failure, the driving linkage arm would break loose from the RVDT splined shaft, allowing the remaining two RVDT's to work. More specifically, a component of each of drivers 392, 436, and 482 could be designed to fail. A likely option would be to make the failure at the securement ends 411, 449, and 495 (see FIG. 7) at the point of attachment to each RVDT shaft 344, 346, and 342 (see FIG. 6).

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A throttle system comprising:
  a throttle lever configured to rotate around a hub;
  a linking system, the linking system mechanically imparting rotation implemented by the throttle lever to an engine control system, the throttle lever rotating about a hub;
  a friction adjustment lever configured to rotate about the hub, the friction adjustment lever configured such that movement in a first direction of rotation around the hub increases friction experienced by the throttle lever, and movement in a second direction of rotation around the hub decreases friction experienced by the throttle; and
  a friction-exempting subsystem, the subsystem preventing the friction created by the friction adjustment lever to be experienced by the linking system.

2. The system of claim 1 wherein:
  the linking system includes at least one rotatable disk which is mechanically linked to and rotates with the throttle lever, the rotating disk driving at least one link to implement rotation into a mechanical-to-electrical conversion device, the mechanical-to-electrical conversion device configured to, upon movements of the lever, transmit signals indicating an extent of displacement which are used by the engine control system to increase or decrease speed.

3. The system of claim 2 comprising:
  a first linking subsystem including a first rotating disk rotatable about the hub, the first disk connected to and driven by the throttle lever to create a first tangential lever, the first lever driving a first link connected to rotate a first mechanical-to-electrical conversion device, the first mechanical-to-electrical conversion device configured to, upon movements of the throttle lever, transmit a first signal indicating a first extent of displacement which is usable by the engine control system to increase or decrease speed;
  a second linking subsystem comprising a second rotating disk rotatable about the hub, the second disk connected to and driven by the throttle lever to create a second tangential lever, the second lever driving a second link connected to rotate a second mechanical-to-electrical conversion device, the second mechanical-to-electrical conversion device configured to, upon movements of the throttle lever, transmits a first signal indicating a second duplicitous extent of displacement which is usable by the engine control system to increase or decrease speed.

4. The system of claim 3 wherein the first and second signals are redundant, the engine control system being operable on either.

5. The system of claim 4 wherein the friction-exempting subsystem exempts the first and second disks from being subjected to friction created by the friction lever.

6. The system of claim 3 wherein the first and second mechanical-to-electrical conversion devices are Rotary Variable Differential Transformers (RVDTs).

7. The system of claim 3 comprising:
  a third linking subsystem including a third rotating disk rotatable about the hub, the third disk connected to and driven by the throttle lever to create a third tangential lever, the third lever driving a third link connected to rotate a third mechanical-to-electrical conversion device, the third mechanical-to-electrical conversion device configured to, upon movements of the throttle lever, transmit a third signal indicating a third extent of displacement which is optionally usable by the engine control system to increase or decrease speed.

8. The system of claim 7 wherein the third signal is redundant of the first and second signals, the engine control system being operable on any of the first, second, or third signals.

9. The system of claim 8 wherein the friction-exempting subsystem prevents the third disk from being subjected to friction created by the friction lever.

10. The system of claim 9 wherein the first, second, and third mechanical-to-electrical conversion devices are Rotary Variable Differential Transformers (RVDTs).

11. The system of claim 2 wherein the friction adjustment lever creates friction using a cam arrangement, the cam arrangement creating compression between the friction adjustment lever and the throttle lever.

12. The system of claim 11 wherein the rotating disk is maintained in mechanical independence from the compression created by the cam arrangement by at least one spacing device, the spacing device bearing at least some of the compression created by the cam arrangement such that the rotating disk is unaffected by the friction.

13. The system of claim 12 wherein the hub is stationary and is secured between two opposing side plates.

14. The system of claim 13 wherein the cam arrangement includes a first cam portion located on a disk portion at the bottom of the friction lever, the first cam portion rotating against a second reciprocating cam portion located on a relatively stationary friction disk located in between the disk portion at the bottom of the friction lever and the throttle lever.

15. The system of claim 14 wherein the relatively stationary friction disk is prevented from rotation by a friction-disk linking bolt which is secured through the opposing side plates.

16. The system of claim 1 wherein the friction adjustment lever is configured to loosen the throttle lever, and secure the throttle lever in place such that a pilot does not need to maintain a hand on the throttle lever to maintain a position.

17. The system of claim 1 comprising:
a throttle disk formed out of a lower portion of the throttle lever to configure the throttle lever to rotate around the hub;
first and second apertures formed through the throttle disk to receive first and second bolts;
the first and second bolts passing through first and second sleeves, the second and first sleeves comprising the friction-exempting subsystem by bearing compression created by the friction lever, and transmitting the compression to the throttle disk.

18. The system of claim 17 comprising:
a first linking subsystem and a second linking subsystem in the linking system;
the first linking subsystem including a first rotating disk rotatable about the hub, the first disk connected to and driven by the throttle lever to create a first tangential lever, the first lever driving a first link connected to rotate a first mechanical-to-electrical conversion device, the first mechanical-to-electrical conversion device configured to, upon movements of the throttle lever, transmit a first signal indicating a first extent of displacement which is usable by the engine control system to increase or decrease speed;
the second linking subsystem comprising a second rotating disk rotatable about the hub, the second disk connected to and driven by the throttle lever to create a second tangential lever, the second lever driving a second link connected to rotate a second mechanical-to-electrical conversion device, the second mechanical-to-electrical conversion device configured to, upon movements of the throttle lever, transmits a first signal indicating a second duplicitous extent of displacement which is usable by the engine control system to increase or decrease speed; and
a compression disk located on the hub, the compression disk being connected to the first and second bolts thus sandwiching the first and second sleeves between the compression disk and the throttle disk, the first and second disks on the hub being contained between the compression disk and the throttle disk thus exempting the first and second disks from compression.

19. A process for securing a throttle in a plurality of positions, comprising:
providing a throttle lever on a hub;
creating rotation using the throttle lever;
tangentially linking a plurality of redundant engine-driving disks on a hub to the throttle lever;
configuring each of the engine-driving disks to redundantly link the throttle lever to an engine control system;
creating compression on the throttle lever using a friction lever such that the throttle lever can be secured into the plurality of positions;
securing the engine-driving disks between a compression-bearing disk on the hub and the throttle lever;
rigidly spacing apart the compression-bearing disk from the throttle lever to bear the compression created by the friction lever and preventing the friction created by the friction adjustment lever to be experienced by the engine-driving disks.

20. A throttle system comprising:
providing a throttle lever on a hub;
creating rotation using the throttle lever;
tangentially linking a plurality of redundant engine-driving disks on a hub to the throttle lever;
configuring each of the engine-driving disks to redundantly link the throttle lever to an engine control system;
creating compression on the throttle lever using a friction lever such that the throttle lever can be secured into the plurality of positions;
securing the engine-driving disks between a compression-bearing disk on the hub and the throttle lever;
rigidly spacing apart the compression-bearing disk from the throttle lever to bear the compression created by the friction lever and preventing the friction created by the friction adjustment lever to be experienced by the engine-driving disks.

* * * * *